(12) United States Patent
Nye et al.

(10) Patent No.: US 12,268,130 B2
(45) Date of Patent: *Apr. 8, 2025

(54) FIXED SPRAY APPLICATION SYSTEM

(71) Applicant: Fixed Spray Systems, LLC, St. Joseph, MI (US)

(72) Inventors: John R. Nye, St. Joseph, MI (US); Dirk Rene Kruger, Bridgman, MI (US)

(73) Assignee: Fixed Spray Systems, LLC, St. Joseph, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/867,148

(22) Filed: Jul. 18, 2022

(65) Prior Publication Data
US 2022/0346328 A1 Nov. 3, 2022

Related U.S. Application Data

(63) Continuation of application No. 16/853,863, filed on Apr. 21, 2020, now Pat. No. 11,388,866, which is a
(Continued)

(51) Int. Cl.
*A01G 25/02* (2006.01)
*A01G 9/24* (2006.01)
(Continued)

(52) U.S. Cl.
CPC ............. *A01G 25/02* (2013.01); *A01G 9/247* (2013.01); *A01M 7/0014* (2013.01);
(Continued)

(58) Field of Classification Search
CPC .......... A01G 25/00; A01G 25/02; A01G 9/24; A01G 9/247; B05B 15/658; B05B 7/2486;
(Continued)

(56) References Cited

U.S. PATENT DOCUMENTS 293,577 A 2/1884 Howe
762,014 A 6/1904 Wittbold
(Continued)

FOREIGN PATENT DOCUMENTS

DE 672296 C 3/1933
DE 380896 9/1993
(Continued)

OTHER PUBLICATIONS

Sparks, Brian, Better Coverage, Better Control: The Solid Set Canopy Delivery System has the Potential to Revolutionize Pest Control in Tree Fruit Orchards, American Fruit Grower, Feb. 2013, 5 pages.
(Continued)

*Primary Examiner* — Christopher S Kim
(74) *Attorney, Agent, or Firm* — Barnes & Thornburg LLP

(57) ABSTRACT

A method of using a system to apply liquid over a selected area includes providing a source of liquid, a first tube for transporting liquid from the source through the system, a connector, a check valve and a spray device. The connector includes a projection extending into the first tube. The projection has an inlet in fluid communication with the first tube. The connector further includes an outlet and a passageway in fluid communication with the inlet of the projection and the outlet of the connector. The check valve has an inlet in fluid communication with the outlet of the connector and an outlet. The check valve is operable to permit the passage of liquid from the inlet to the outlet upon pressurization of the liquid above a threshold pressurization level. The method includes the steps of introducing an amount of liquid to be applied to the selected area from the source of liquid to the first tube at a pressure below the threshold pressurization level of the check valve and pro-
(Continued)

viding pressurized liquid through the first tube to pressurize the liquid in the first tube above the threshold pressurization level of the check valve, thereby transporting liquid from the first tube, through the connector and the check valve and through the spray device in response to pressurization of the liquid. The liquid may be ozonated water.

11 Claims, 22 Drawing Sheets

Related U.S. Application Data continuation of application No. 15/894,443, filed on Feb. 12, 2018, now Pat. No. 10,660,278, which is a continuation-in-part of application No. 15/295,076, filed on Oct. 17, 2016, now Pat. No. 10,433,499, which is a continuation of application No. 14/192,232, filed on Feb. 27, 2014, now Pat. No. 9,468,161.

(60) Provisional application No. 61/770,551, filed on Feb. 28, 2013.

(51) Int. Cl.
*A01M 7/00* (2006.01)
*B05B 7/24* (2006.01)
*B05B 15/658* (2018.01)
*B05B 9/04* (2006.01)
*B05B 15/654* (2018.01)

(52) U.S. Cl.
CPC .......... *B05B 7/2486* (2013.01); *B05B 7/2491* (2013.01); *B05B 15/658* (2018.02); *B05B 9/0423* (2013.01); *B05B 15/654* (2018.02)

(58) Field of Classification Search
CPC ... B05B 7/2491; B05B 15/654; B05B 9/0423; A01M 7/0014
USPC ...................................... 239/273–285, 208, 1
See application file for complete search history.

(56) References Cited

U.S. PATENT DOCUMENTS

| | | | |
|---|---|---|---|
| 910,400 A | 1/1909 | Lischer | |
| 1,824,563 A | 9/1931 | O'Connor | |
| 2,682,393 A | 6/1954 | Norgren | |
| 2,932,433 A | 4/1960 | Abplanalp | |
| 3,606,157 A | 9/1971 | Chapin | |
| 3,630,448 A | 12/1971 | Chapin | |
| 3,762,170 A | 10/1973 | Fitzhugh | |
| 3,863,841 A | 2/1975 | Berthoud | |
| 5,314,116 A | 5/1994 | Krauth et al. | |
| 5,522,548 A | 6/1996 | Gallien et al. | |
| 5,794,849 A | 8/1998 | Elder | |
| 5,816,498 A | 10/1998 | Smith, Jr. et al. | |
| 6,009,954 A | 1/2000 | Phillips | |
| 6,175,969 B1 | 1/2001 | Edwards | |
| 6,279,589 B1 | 8/2001 | Goodley | |
| 6,499,671 B1 | 12/2002 | Sands et al. | |
| 6,523,616 B1 | 2/2003 | Wallace | |
| 6,622,943 B2 | 9/2003 | Poisson et al. | |
| 6,817,541 B2 | 11/2004 | Sands et al. | |
| 7,022,225 B1 | 4/2006 | Clawson et al. | |
| 7,578,486 B1 | 8/2009 | Taylor | |
| 7,597,276 B2 | 10/2009 | Hawkins | |
| 7,604,780 B2 | 10/2009 | Teran et al. | |
| 8,777,123 B2 | 7/2014 | Stevens et al. | |
| 9,278,153 B1 | 3/2016 | Tsang | |
| 9,468,161 B2 * | 10/2016 | Nye | A01G 25/02 |
| 10,433,499 B2 * | 10/2019 | Nye | A01M 7/0014 |
| 10,660,278 B2 * | 5/2020 | Nye | B05B 7/2486 |
| 11,388,866 B2 * | 7/2022 | Nye | B05B 7/2491 |
| 2003/0150933 A1 | 8/2003 | Sands et al. | |
| 2009/0021006 A1 | 1/2009 | Hobbs | |
| 2011/0095094 A1 | 4/2011 | Stevens et al. | |
| 2012/0110827 A1 | 5/2012 | Doolittle et al. | |
| 2016/0334026 A1 | 11/2016 | Wadhwani et al. | |
| 2017/0027112 A1 | 2/2017 | Vail et al. | |

FOREIGN PATENT DOCUMENTS

| | | |
|---|---|---|
| EP | 0158250 A2 | 10/1985 |
| FR | 1131614 | 2/1957 |
| FR | 2342915 A1 | 9/1977 |
| GB | 1213108 | 11/1970 |
| GB | 2438361 A | 11/2007 |
| WO | 9524970 A1 | 9/1995 |
| WO | 2005118153 A1 | 12/2005 |

OTHER PUBLICATIONS

Jain Irrigation Inc., Compression Fittings, 2010, 8 pages.
European Patent Office, Communication Relating to the Results of the Partial International Search for PCT/US2014/018975, Jun. 4, 2014, 2 pages.
European Patent Office, International Search Report issued in international patent application PCT/US2014/018975, Sep. 3, 2014, 6 pages.
European Patent Office, Written Opinion issued in international patent application PCT/US2014/018975, Sep. 3, 2014, 10 pages.
European Patent Office, International Preliminary Report on Patentability in corresponding PCT Application PCT/US2014/018975, Sep. 1, 2015, 11 pages.
Agnello, Aruther, Andrew Landers, Bruce Wadhams and Walid Shayya, Current Progress in Developing a Fixed-Spray Application System for High-Density Apple Plantings, Jan. 1, 2006, 22 pages.
Saint-Gobain Performance Plastics Seals, OmniSeal Seal Helps Prevent Blowout in Rocket Engine Check Valves, www.seals.saint-gobain.com, Apr. 30, 2014, 2 pages.
Borgwarner, Pressure Relief Valve, www.borgwarner.com, Feb. 8, 2016, 1 page.
Our.Windowfarms, Issue-Airlift Depriming, http://our.windowfarms.org, Feb. 8, 2016, 3 pages.
European Patent Office, International Search Repot in corresponding international patent application PCT/US2019/017456, Jun. 4, 2019, 6 pages.
European Patent Office, Written Opinion of the International Searching Authority in corresponding international patent application PCT/US2018/017456, Jun. 4, 2019, 7 pages.

* cited by examiner

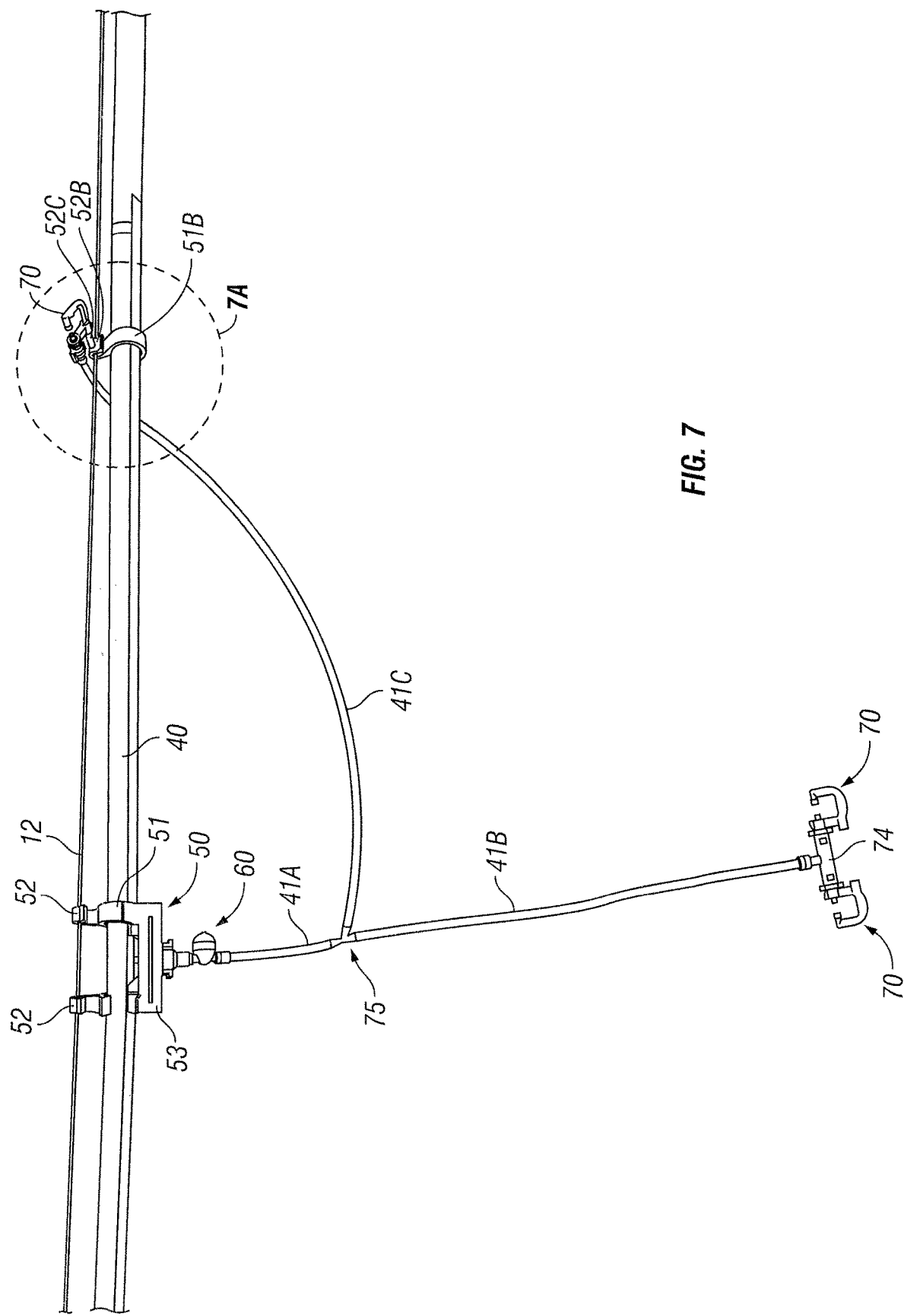

FIXED SPRAY APPLICATION SYSTEM

This application is a continuation of U.S. patent application Ser. No. 16/853,863, filed Apr. 21, 2020 ("the '863 Application"), which is presently pending, which is a continuation of U.S. patent application Ser. No. 15/894,443, filed Feb. 12, 2018, ("the '443 Application"), which issued May 26, 2020 as U.S. Pat. No. 10,660,278, ("the '278 Patent), which is a continuation-in-part of U.S. patent application Ser. No. 15/295,076 filed Oct. 17, 2016 ("the '076 Application"), which issued Oct. 8, 2019 as U.S. Pat. No. 10,433,499, ("the '499 Patent), which is a continuation of U.S. patent application Ser. No. 14/192,232 filed Feb. 27, 2014 ("the '232 Application"), which issued Oct. 18, 2016 as U.S. Pat. No. 9,468,161 ("the '161 Patent"), which is a regular utility patent application claiming priority of U.S. Provisional Patent Application Ser. No. 61/770,551 filed Feb. 28, 2013 ("the '551 Application"). The present application claims priority from the '863 Application, '443 Application, '076 Application, the '232 Application and the '551 Application. The complete descriptions, drawings and disclosures of the '863 Application, '443 Application, the '076 Application, the '232 Application, '551 Application, the '278 Patent, the '499 Patent and the '161 Patent are hereby incorporated by reference in their entireties into the present application as if such descriptions, drawings and disclosures were fully set forth herein.

The present invention relates to a method and apparatus for applying liquids to trees, crops and other plants and, in particular, to an apparatus for spraying liquids, including but not limited to ozonated water, onto trees, crops and other plants.

Various agricultural chemicals, such as insecticides and fungicides, may be applied to trees, crops and other plants to protect the plants from pests and other hazards. Ozonated water may also be applied to eliminate insects and disease and for other purposes. Various systems have been developed for applying agricultural chemicals and ozonated water in agricultural settings.

BACKGROUND AND SUMMARY OF THE INVENTION

In one embodiment of the present invention, a method of using a system to apply liquid over a selected area includes providing a source of liquid, and providing a first tube disposed generally parallel to the ground for transporting liquid from the source through the system. The first tube has a passageway through which the liquid is transported, a wall surrounding the passageway, and an opening extending through the wall perpendicular to the passageway. The method also includes providing a connector secured to the first tube. The connector includes a projection extending through the opening in the wall of the first tube and into the passageway, an inlet in fluid communication with the first tube, an outlet, and a passageway in fluid communication with the inlet of the projection and the outlet of the connector. The method also includes providing a spray device in fluid communication with the outlet of the connector. The spray device is located below the first tube. The method also includes introducing an amount of liquid to be applied to the selected area from the source of liquid to the first tube, and providing pressurized liquid through the first tube to pressurize the liquid in the first tube, thereby transporting liquid from the first tube, through the connector, and through the spray device in response to pressurization of the liquid.

In one embodiment, the method further includes providing a ball and socket joint having a passageway therethrough. The spray device is in fluid communication with the outlet of the connector through the passageway of the ball and socket joint, and the liquid is transported from the first tube, through the connector, through the ball and socket joint, and through the spray device in response to pressurization of the liquid.

In another embodiment, the connector at least partially surrounds the first tube.

In one embodiment, the method further includes providing at least one wire and the connector suspends the first tube from the wire above the area over which the liquid is to be applied.

In certain embodiments, the method includes providing a second connector and a second spray device. The second connector has an inlet in fluid communication with the passageway of the ball and socket joint, a first outlet in fluid communication with one of the spray devices, and a second outlet in fluid communication with the other spray device.

In some embodiments, the source of liquid includes an enclosure for transporting the liquid and the first tube is external to the enclosure.

In other embodiments, the liquid is ozonated water.

These and other features of the present invention will be apparent from the following description and accompanying drawings.

BRIEF DESCRIPTION OF THE DRAWINGS

FIG. 7 is a plan view of certain components of a spray system according to another embodiment of the present invention.

DETAILED DESCRIPTION OF EMBODIMENTS OF THE INVENTION

Figure 1:
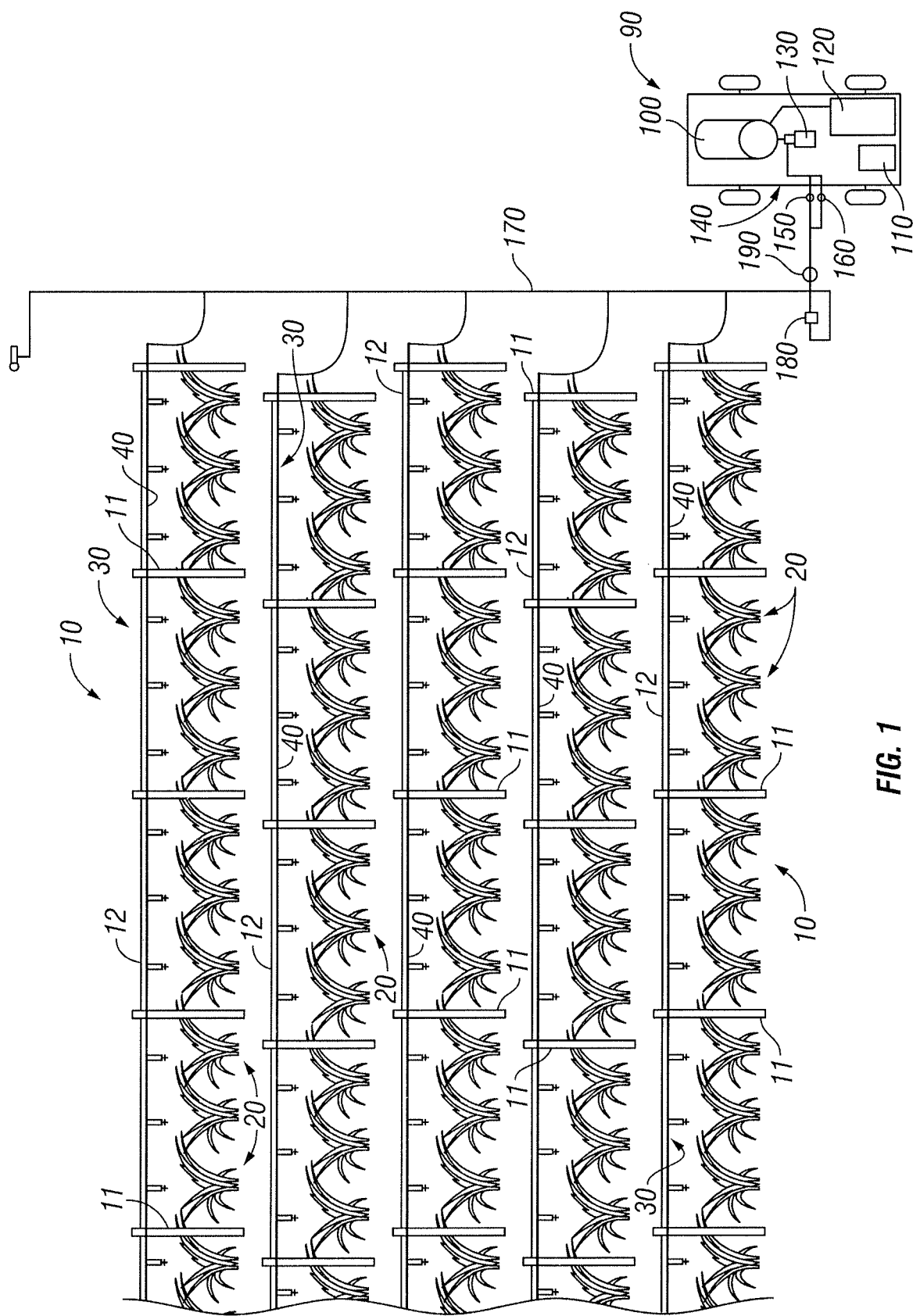
FIG. 1 illustrates a spray system according to one embodiment of the present invention installed on a trellis system.

FIG. 1 illustrates a fixed spray application system according to one embodiment of the present invention used in connection with a typical trellis system 10. Trellis system 10 generally includes supports 11 having a plurality of trellis wires 12 extending between supports 11. Trellis system 10 is utilized in connection with trees 20 or other plants in the manner conventional in the art.

Figure 2:
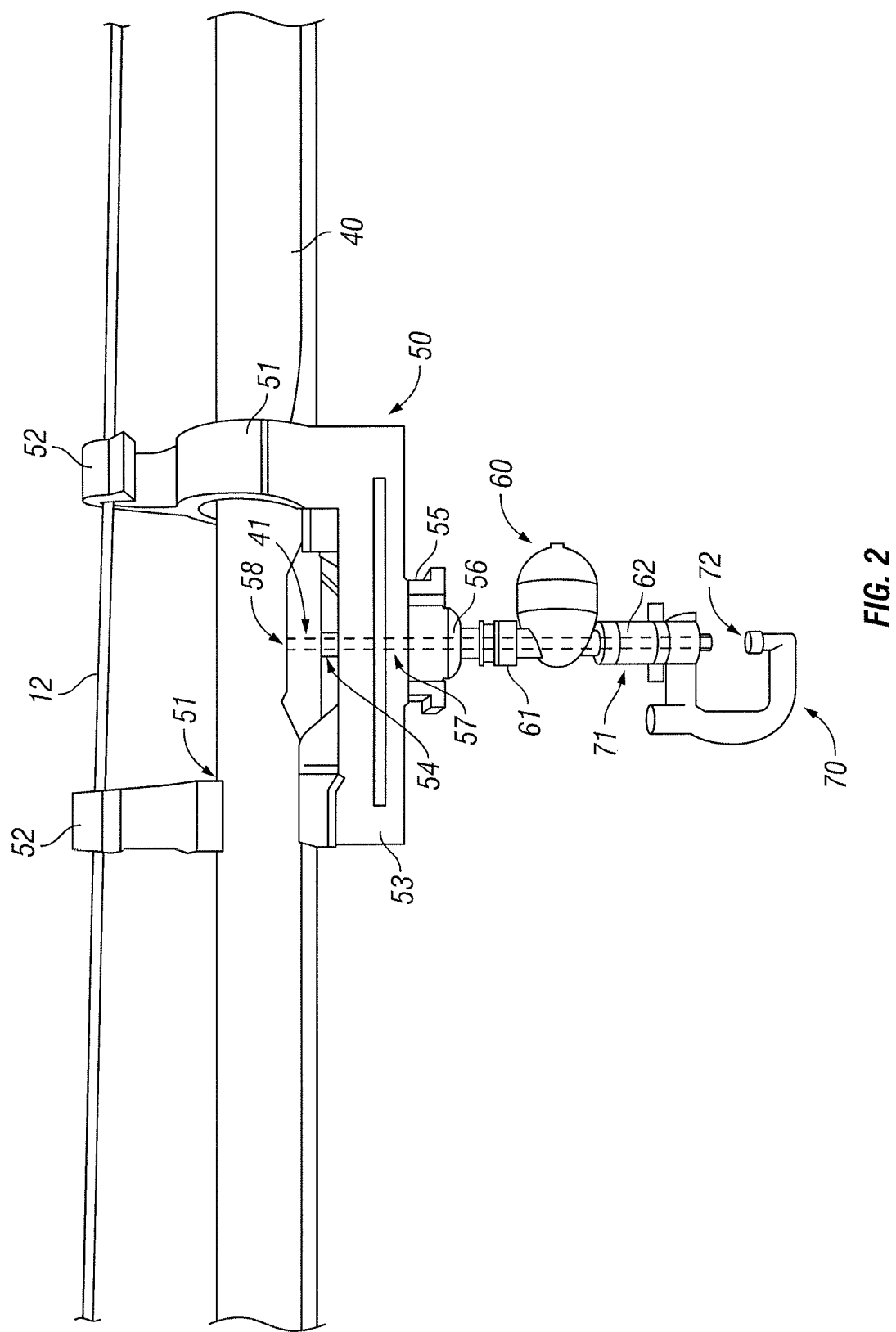
FIG. 2 is a plan view of certain components of the spray system of FIG. 1.
Figure 3:
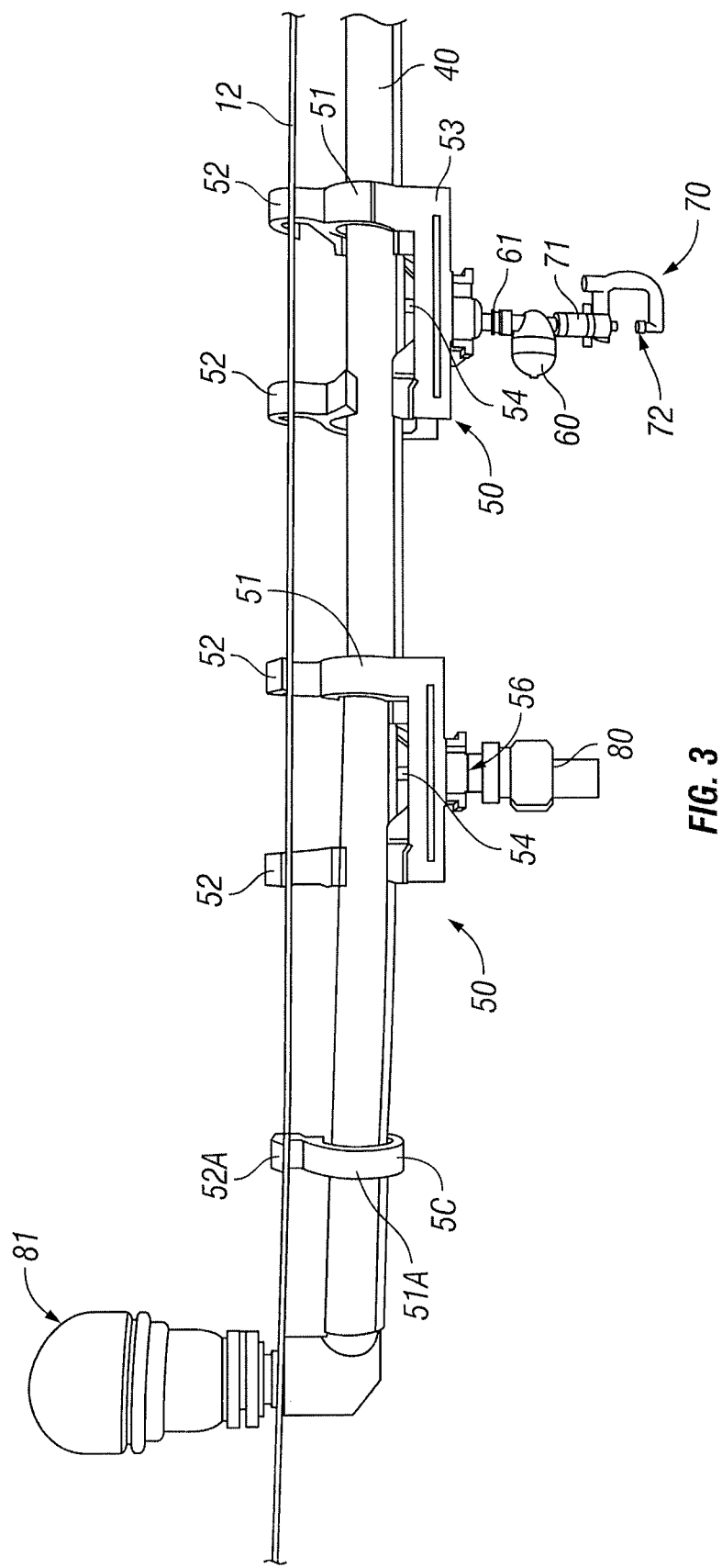
FIG. 3 is a plan view of the components of FIG. 2 and a drainage device and air relief valve that are also components of the spray system of FIG. 1.

As shown in FIGS. 1-3, the spray system 30 generally includes multiple rows of first tube 40, a plurality of combination tubing connector and spray device connectors 50, a plurality of check valves 60, a plurality of spray devices 70 and at least one drainage device 80 and air relief valve 81.

Tubing 40 in the embodiment shown includes one or more openings 41 formed therein for use in connection with connector 50 as described below. Openings 41 are sized and spaced so as to supply ozonated water or other liquids to spray devices 70 in the desired volume and in the desired time based on the particular application. In one embodiment of the invention, a locator (such as a colored stripe) is integrally formed with or added to tubing 40 to facilitate locating openings 41 during installation of spray system 30. The material from which tubing 40 is constructed and the properties of tubing 40 are selected based on the operating conditions under which spray system 30 will be used. For example, it may be desirable to use a material that resists deterioration in response to exposure to sunlight, freezing temperatures, etc. In one embodiment of the invention, tubing 40 is extruded from plastic resin, such as polyethylene. In one embodiment of the invention, the outer layer of tubing 40 is white or light colored for the purpose of minimizing lateral expansion and contraction due to changes in ambient temperature or the effects of direct sunlight on tubing 40. The inside portion of the tubing 40 could be black and could utilize carbon black to increase the operational life of tubing 40. The diameter, wall thickness and other dimensions of tubing 40 can also be selected based on the operating conditions of spray system 30. In one embodiment of the invention, the diameter of tubing 40 is selected so as to minimize friction losses associated with moving liquid through tubing 40 for row lengths of 700 feet or more with lateral spacing of openings 41 between 2 and 6 feet. In one embodiment, the wall thickness of tubing 40 is selected so as to withstand an operating pressure of 60 psi.

In the embodiment shown, connector 50 generally includes a pair of oppositely facing C-hooks 51 each including a trellis wire hook 52 at one end thereof, a curved base 53 having a projection 54 extending therefrom, a connector section 55 adjacent an outlet 56 and an internal passageway 57. Curved base 53 is configured to generally follow the contour of the outer surface of tubing 40. Projection 54 has an inlet 58 in fluid communication with outlet 56 through passageway 57. Connector section 55 can include threads, bayonet connector features or other devices for connecting check valve 60 or other components to connector 50 as described below. Connector 50 is secured to tubing 40 by positioning connector 50 such that C-hooks 51 are on either side of tubing 40, inserting projection 54 into an opening 41 and rotating connector 50 such that C-hooks 51 snap into place around tubing 40. Trellis hooks 52 are then used to hang tubing 40 and connector 50 from a trellis wire 12.

Check valve 60 includes a first or inlet end 61 and a second or outlet end 62. First end 61 is provided with structure (such as threads, a bayonet connection or other structure) that interacts with connector section 55 of connector 50 to secure inlet end 61 of check valve 60 to connector 50. Second end 62 is provided with structure (such as threads, a bayonet connection or other structure) that interacts with spray device 70 to secure spray device 70 to second end 62 of check valve 60. A variety of different types of check valves can be used as check valve 60. For example, commercially available leak prevention devices that are known in the industry can be used as check valve 60. The operating pressure of check valve 60 is selected so as to prevent the discharge of ozonated water from spray system 30 while the system is being primed and until a specified pressure is reached so as to cause discharge through substantially all of spray devices 70 at substantially the same time. In one embodiment of the invention, check valves 60 will not open until at least 35 psi of pressure is applied.

Spray device 70 has a first or inlet end 71 and a second or outlet end 72. First end 71 is provided with structure (such as threads, a bayonet connection or other structure) that interacts with second end 62 of check valve 60 to secure spray device 70 to second end 62 of check valve 60.

Drainage devices 80 can be placed at the end of each row of tubing 40 and/or at low points along tubing 40 to drain spray system 30 after use. Any of a number of different apparatus may be used as drainage devices 80. In one embodiment of the invention, drainage devices 80 are spring loaded flush valves that open when the pressure in the system drops to 2.5 psi or less. As shown in FIG. 3, drainage devices 80 may be installed on tubing 40 by connecting a drainage device 80 to connector section 55 of a connector 50.

Spray system 30 may also be provided with an air relief valve 81 at the end of tubing 40 to allow air trapped in spray system 30 to exit the system during the process of filing the system with ozonated water as described below. Any number of known air relief valves can be used. For example, air relief valve 81 could be of the type that includes a float mechanism that would allow air to escape but which would seal off air relief valve 81 when ozonated water reached the end of tubing 40. A support clip SC including a C-hook 51A and a trellis wire hook 52A may be utilized to support tubing 40 from trellis wire 12 adjacent relief valve 81 as shown in FIG. 3.

Ozonated water can be delivered to system 30 in a variety of ways. In one embodiment of the invention shown in FIG. 1, ozonated water is transported to the area to be sprayed by a portable pumping unit 90 having at least one tank 100, a generator 110, an ozone producing apparatus 120 for creating fresh ozonated water with the desired concentration of ozone, a pump 130, piping 140, a low pressure regulator 150 and a high pressure regulator 160. Piping 140 connects portable pumping unit 90 to a supply pipe manifold 170 having a connect/disconnect fitting 190 and a control valve 180. Control valve 180 can be used to start and stop the flow of ozonated water to pipe manifold 170. Pipe manifold 170 is connected to first tubes 40 as shown in FIG. 1. Pipe manifold 170 can be either above ground or below ground. Pipe Manifold 170 may be made from polyethylene tubing for above ground and shallow in ground installations. Placing supply pipe manifold 170 below ground would, in most circumstances, maintain the ozonated water at a lower temperature, which may maintain the effectiveness of the ozonated water for a longer period of time.

To utilize spray system 30 to apply ozonated water to plants 20, portable pumping unit 90 supplies ozonated water to supply pipe manifold 170 through low pressure regulator 150 at a pressure below that at which check valves 60 will open (i.e., below the threshold pressurization level of check valves 60). In this manner, spray system 30 can be filled with ozonated water without activating spray devices 70. Once spray system 30 is filled, additional ozonated water is supplied to system 30 through high pressure regulator 160 at a pressure sufficient to open check valves 60, resulting in discharge of ozonated water through spray devices 70. In one embodiment of the invention, ozonated water is discharged substantially simultaneously through substantially all spray devices 70.

In another embodiment of the invention, portable pumping unit 90 can be disconnected after the system is filled with ozonated water and a compressor can be connected to pipe manifold 170 to force ozonated water out of the system using pressurized air.

In another embodiment of the invention, ozonated water is produced at a fixed location and supplied to spray system 30 through a network of pipes. In this embodiment, spraying can be automated with the use of valves and timers configured to spray one or more zones of the area to be sprayed at predetermined times and for specified durations.

The ozone gas dissolved in the ozonated water remaining in spray system 30 and pipe manifold 170 will begin to return to its previous state after spraying is completed. This breakdown of the ozone gas will cause the ozonated water to return to its simple water state which is harmless to plants, humans and animals. It may be desirable to remove the water so that it is not discharged prior to the discharge of fresh ozonated water during the next application. Drainage devices 80 facilitate emptying tubing 40. The same or similar drainage devices 80 can be installed in pipe manifold 170 for the same purpose. Other means may also be used for draining spray system 30 and pipe manifold 70. For example, compressed air could be used to expel the water. Alternatively, or in addition, at least one spray device 70 could be provided without a check valve 60. This would also facilitate removal of air trapped in tubing 40 and pipe manifold 170 during filling. The various means of draining spray system 30 and pipe manifold 170 can also be used to flush spray system 30 and pipe manifold 170 to winterize the system.

Figure 4:
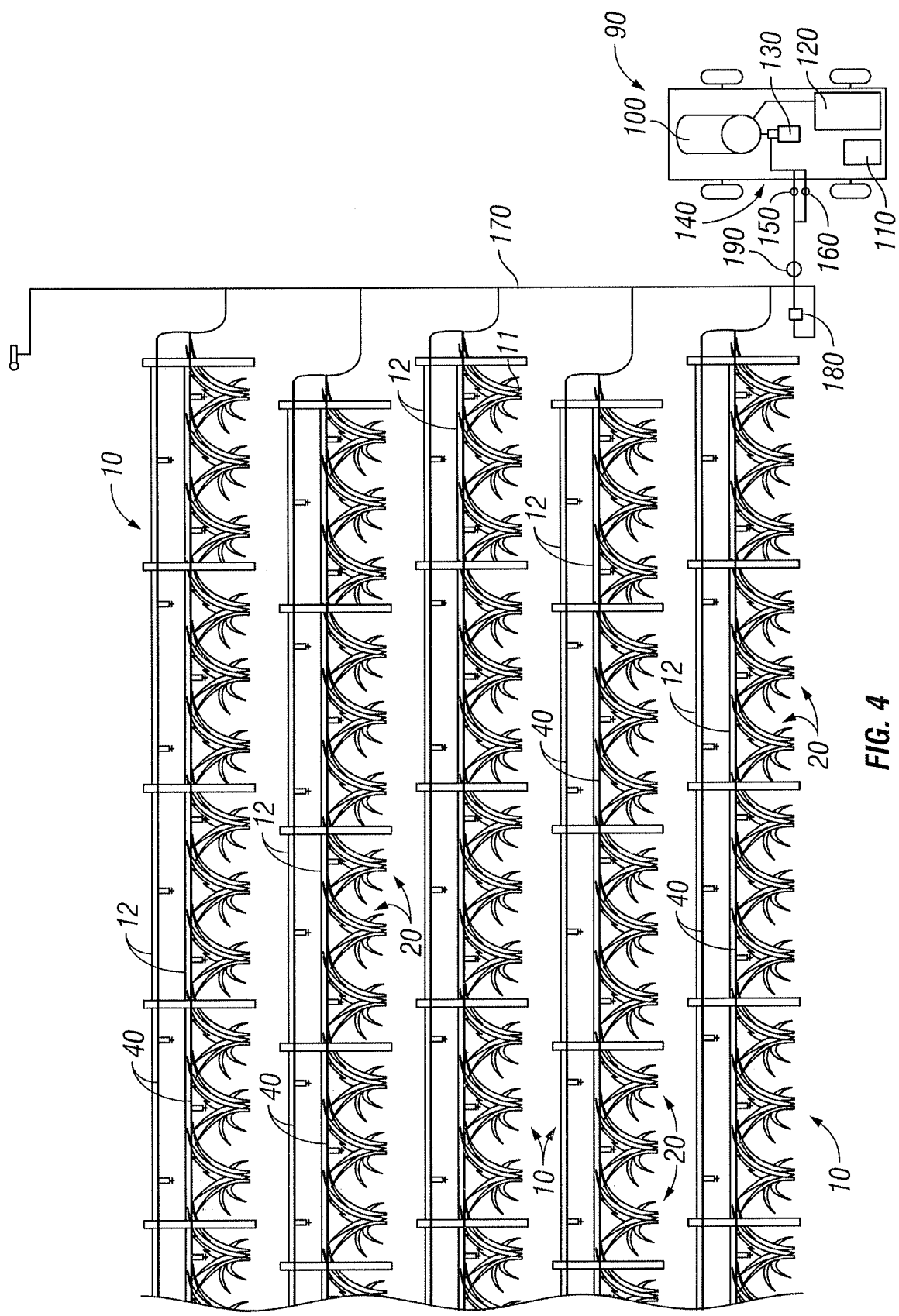
FIG. 4 illustrates a spray system according to another embodiment of the present invention installed on a trellis system.

FIG. 4 shows an alternative embodiment of spray system 30 in which each row of plants 20 has two lines of tubing 40 installed therein, one above the other.

Figure 5:
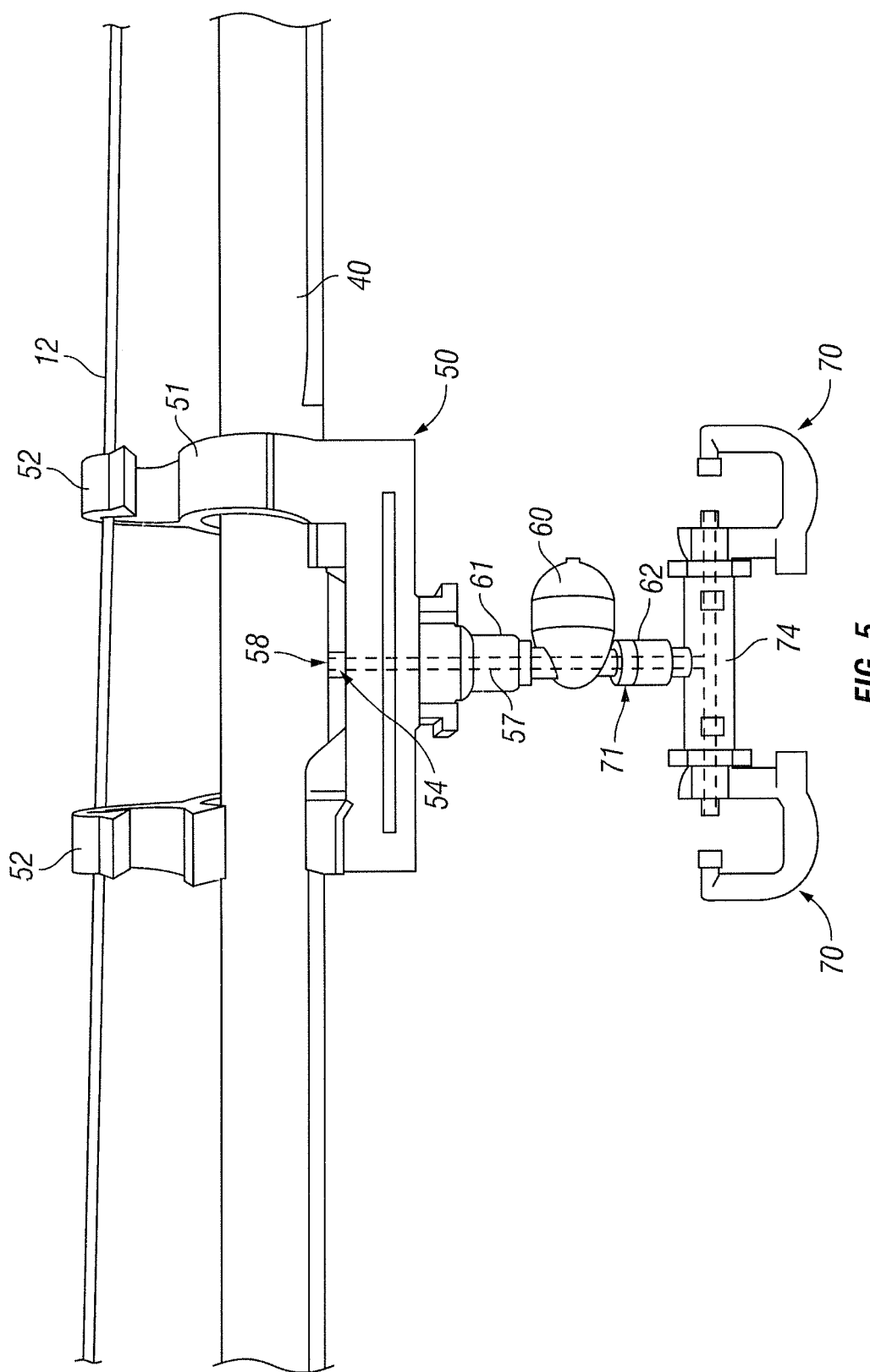
FIG. 5 is a plan view of certain components of a spray system according to another embodiment of the present invention.

FIG. 5 shows an alternative embodiment of the present invention. In this embodiment, a T-shaped connector 74 is connected to outlet end 62 of check valve 60 and to inlet ends 71 of two spray devices 70. The length of connector 74 is selected so as to position spray devices 70 in the proper position relative to the foliage to be sprayed based on the desired application.

Figure 6:
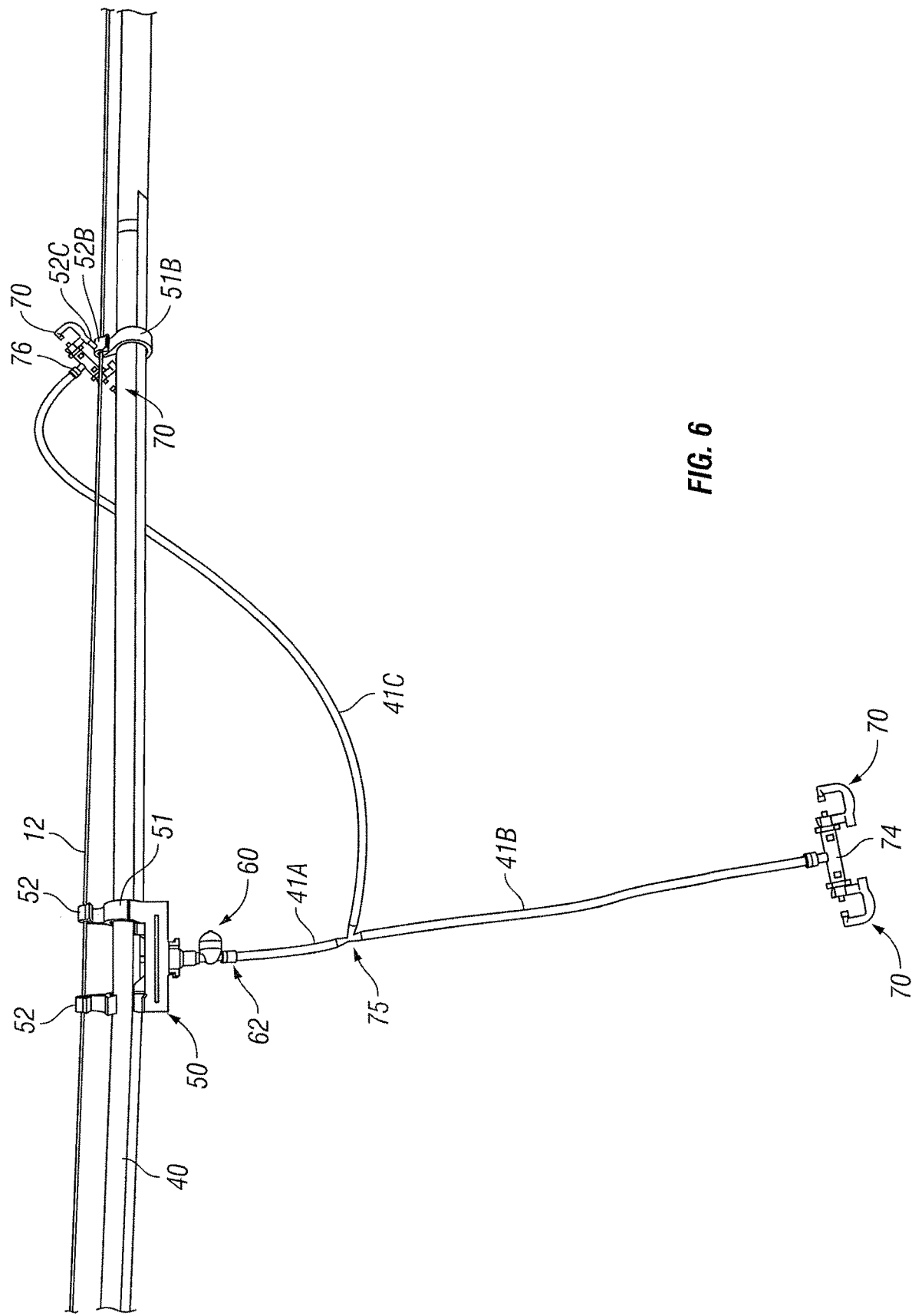
FIG. 6 is a plan view of certain components of a spray system according to another embodiment of the present invention.
Figure 7A:
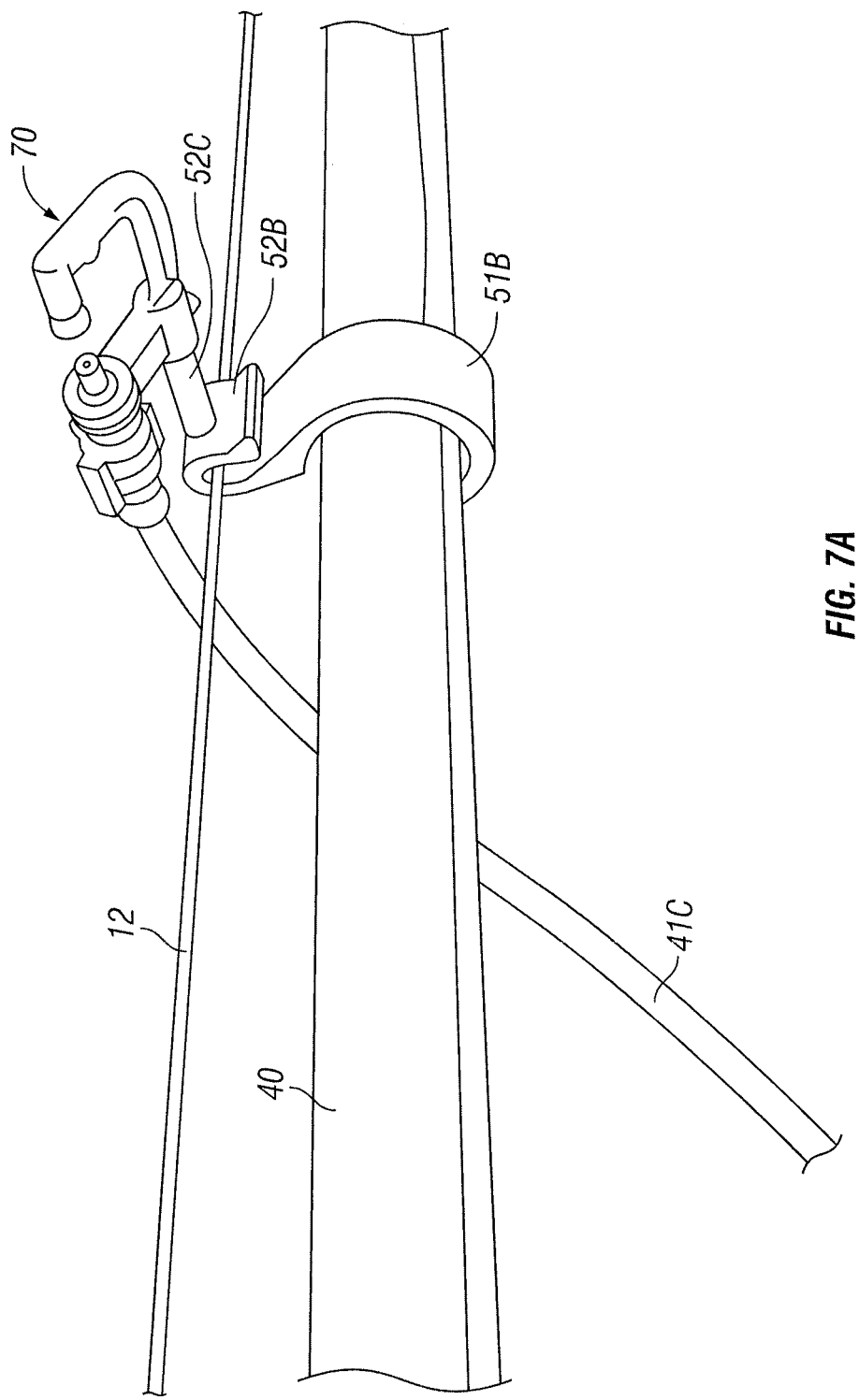
FIG. 7A is a detailed view of the components indicated in FIG. 7.

FIG. 6 illustrates another embodiment of the present invention. In this embodiment, a first section of tubing 41A extends from outlet 62 of check valve 60 to a T-shaped connector 75, a second section of tubing 41B extends from connector 75 to T-shaped connector 74 and a third section of tubing 41C extends from connector 75 to a T-shaped connector 76. Two spray devices 70 are connected to connector 76. The length of connector 76 is selected so as to position spray devices 70 in the proper position relative to the foliage to be sprayed based on the desired application. This embodiment further includes a C-hook 51B having a trellis wire hook 52B formed therewith. A spray device support 52C is connected to trellis wire hook 52B and at least one of the spray devices 70. C-hook 51B can be used to position spray devices 70 along tubing 40 as desired. Similarly, the lengths of tubing 41A, 41B and 41C may be varied to position spray devices 70 as desired. FIGS. 7 and 7A show yet another embodiment of the present invention. In this embodiment, a single spray device 70 is connected to tubing 41C.

Figure 8A:
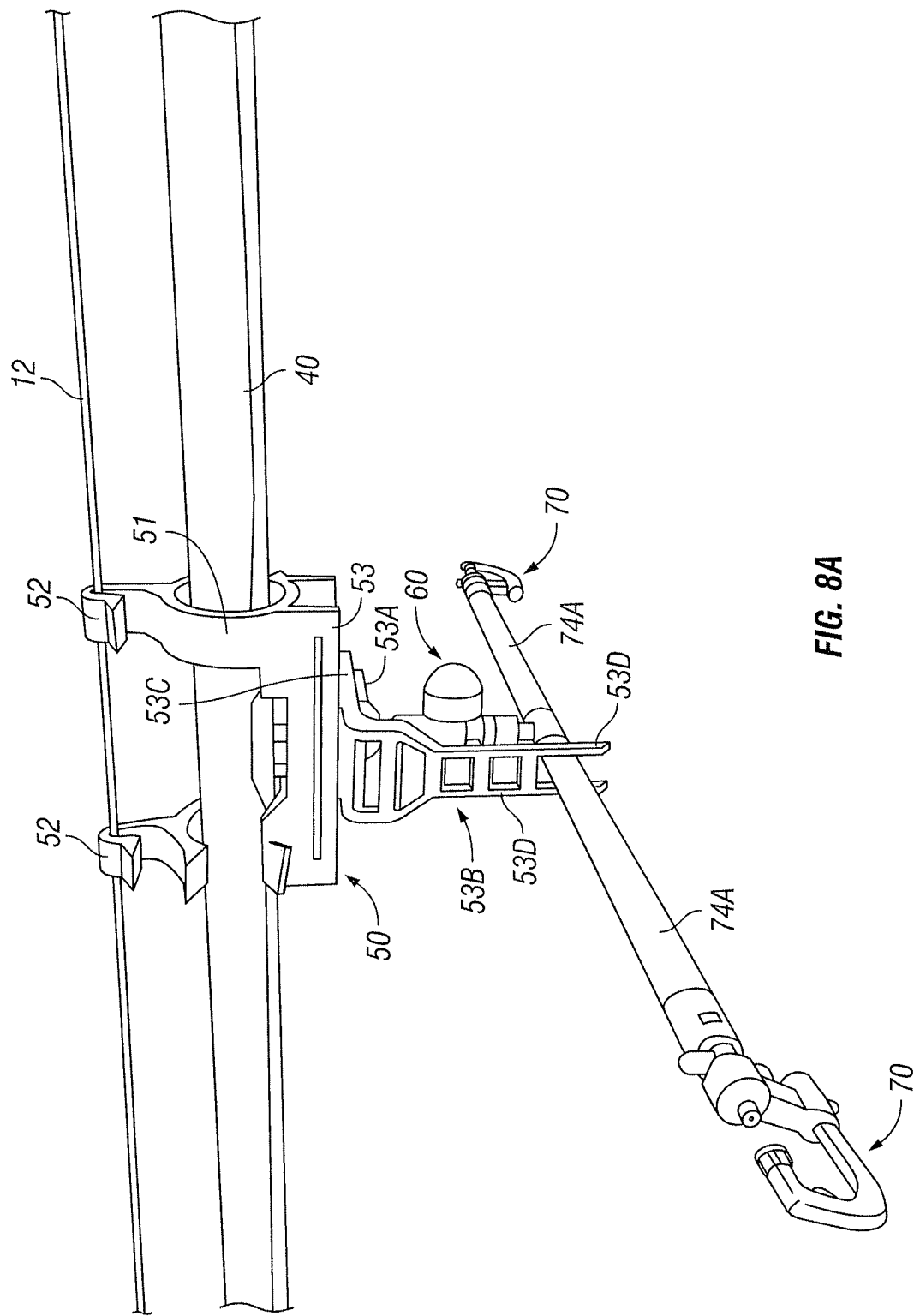
FIG. 8A is a top perspective view of certain components of a spray system according to another embodiment of the present invention.
Figure 8C:
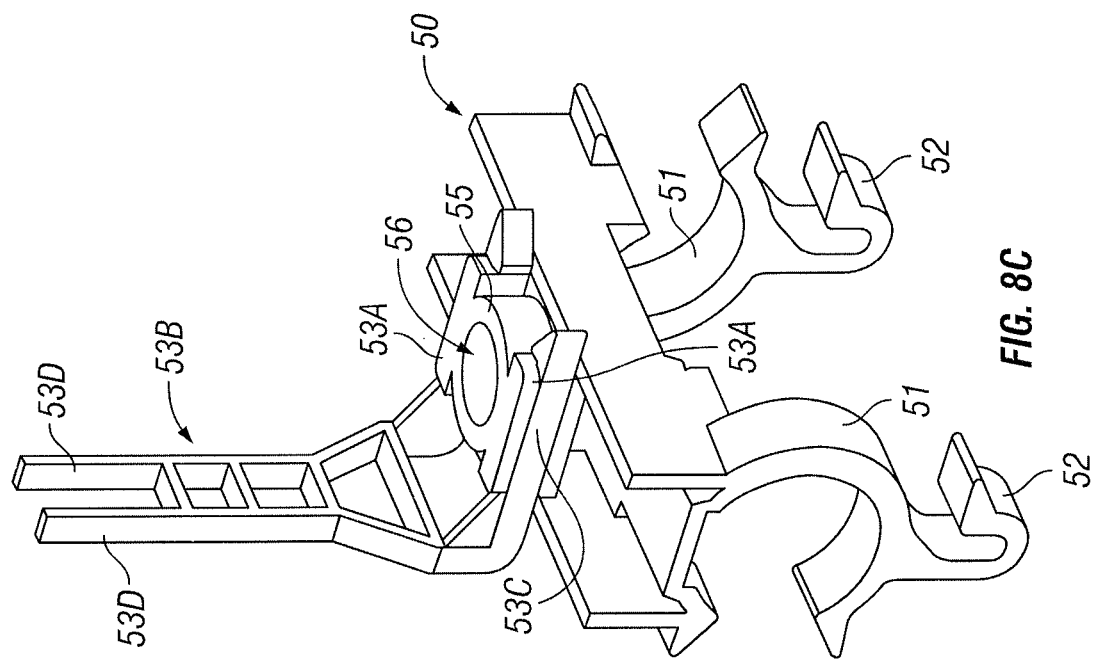
FIG. 8C is a perspective view of certain components alternative embodiment of a connector that is a component of spray systems according to certain embodiments of the present invention.
Figure 8B:
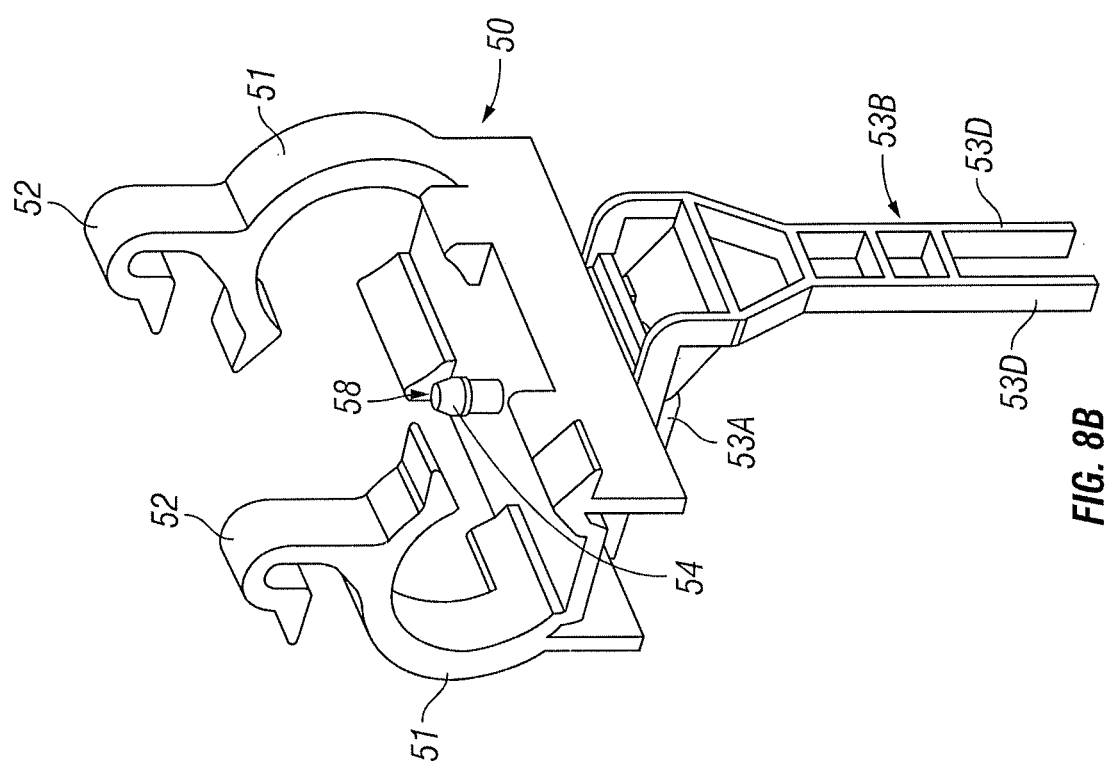
FIG. 8B is a bottom perspective view of the components shown in FIG. 8 B.

FIGS. 8A, 8B and 8C show an alternative embodiment of connector 50. In this embodiment, projections 53A are formed on base 53 of connector 50. Projections 53A provide a mounting location for a directional clip 53B that can be used to align spray devices 70 in the orientation necessary to obtain the desired direction of spray. In the embodiment shown, directional clip 53B has a pair of mounting arms 53C for selectively engaging projections 53A to secure directional clip 53B to connector 50 and a second pair of arms 53D to constrain movement of spray devices 70. As shown for example in FIG. 8A, each of two extensions 74A may be connected at one end to connector 74 and at an opposite end to a spray device 70. One extension 74A is positioned between arms 53D of directional clip 53B, which prevents rotation of connector 74. Note that arms 53C of directional clip 53B can be positioned in any orientation on connector 50, which results in the ability to position spray devices 70 in any location along a 360 degree path.

Figure 9:
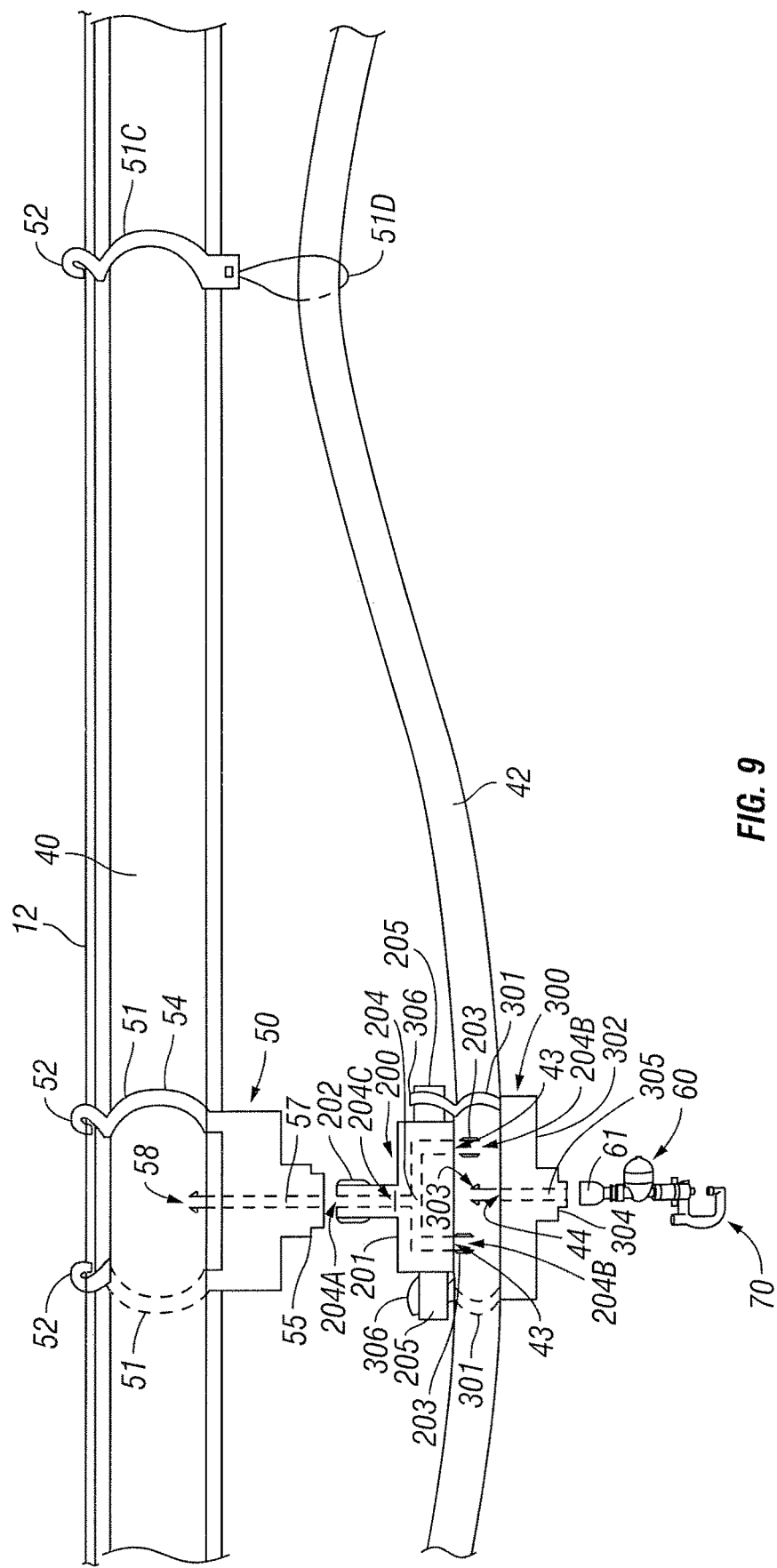
FIG. 9 is a plan view of certain components of a spray system according to another embodiment of the present invention.

FIG. 9 illustrates a spray system 30 according to another embodiment of the present invention. This embodiment is primarily intended for applying insecticide, fungicide or other chemicals to plants 20. As shown in FIG. 9, spray system 30 generally includes tubing 42 disposed below tubing 40 and a combined tubing connector and spray device connector having a first part 200 and a second part 300. Tubing 42 has pairs of openings 43 formed therein and individual openings 44 formed on the opposite side of tubing 42 between openings 43.

First part 200 includes a body portion 201 with a projection 202 extending therefrom. Projection 202 is in fluid communication with projections 203 which extend from the curved, opposite side of body 201 through a channel 204 in body 201. Channel 204 has an inlet 204A, two outlets 204B and a check valve 204C located therein. In one embodiment of the invention, projections 203 are angled inwardly toward the center of body portion 201. Projection 202 includes means (such as threads, a bayonet connector or other devices) for securing part 200 to connector section 55 of connector 50. Part 200 further includes a pair of projections 205 extending from each side of body portion 201. Projections 205 support part 300 as described below.

Part 300 includes a pair of C-hooks 301, the open sides of which face opposite directions, a curved base 302, a projection 303 extending from base 302 and a connector portion 304 on the opposite side of base 302 from projection 303. A channel 305 extends through projection 303 and connector portion 304. A pair of hangers 306 extends from the tops of C-hooks 301.

To assemble this embodiment of spray system 30, projection 202 of part 200 is secured to connector portion 55 of connector 50. Part 300 is positioned such that C-hooks 301 are on opposite sides of tubing 42 with projection 303 extending into an opening 44. Part 300 is then rotated such that C-hooks 301 engage tubing 42. Openings 43 in tubing 42 are then engaged with projections 203 on part 200 and hangers 306 are engaged with projections 205 on part 200. Spray system 30 may be provided with additional means for supporting tubing 42, such as a C-hook 51C having a trellis wire hook 52 and a loop 51D through which tubing 42 extends. Loop 51 D can be a zip tie or other device. A leak protection device 60 with one or more spray devices 70 is then connected to connector portion 304 of part 300.

Figure 10:
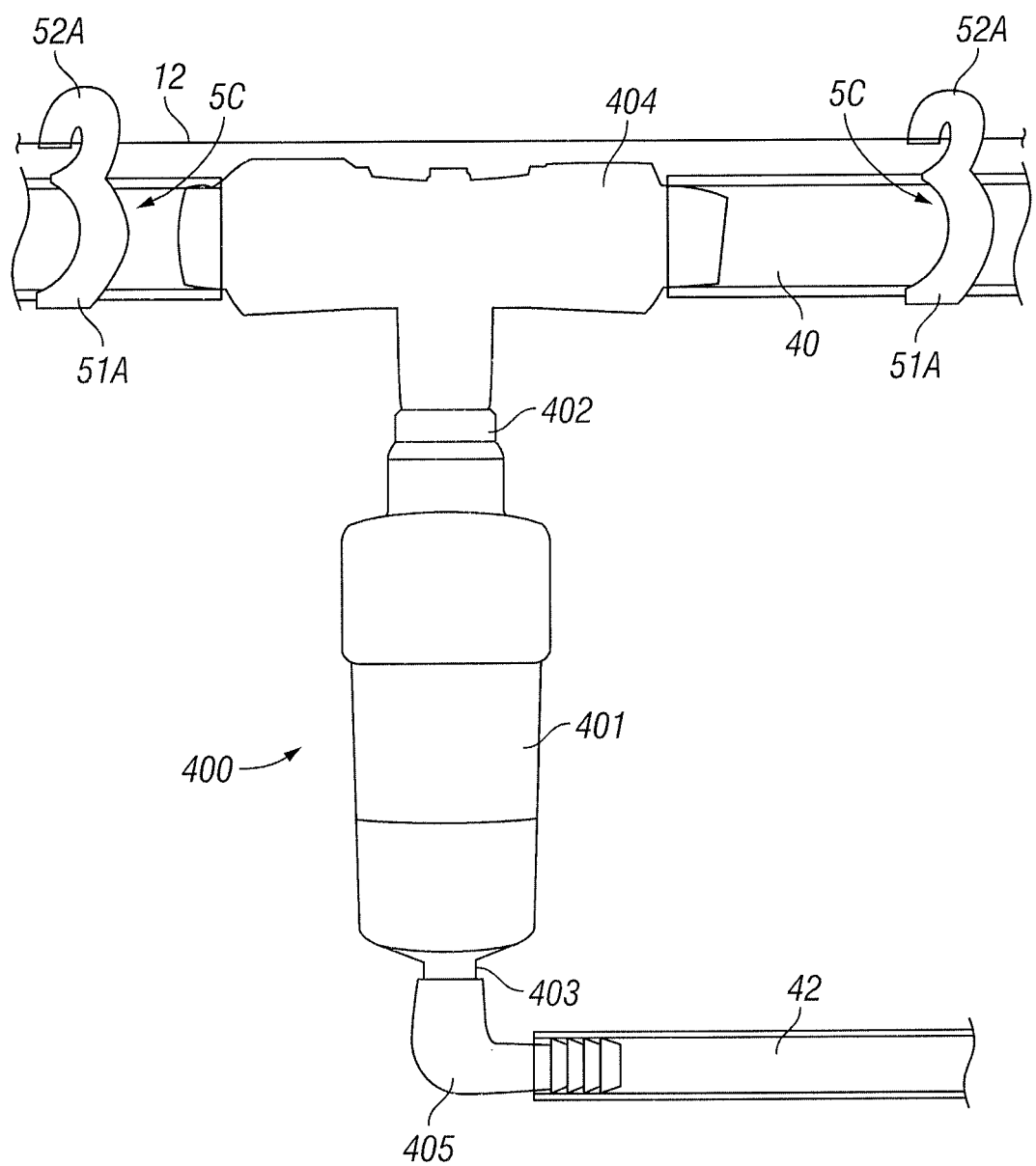
FIG. 10 is a plan view of a reservoir that is a component of the spray system of FIG. 9.

Referring to FIG. 10, a reservoir 400 is located at one end of tubing 40 and tubing 42. Reservoir 400 has a chamber 401, a float valve (not shown) located in chamber 401, a first open end 402 and a second open end 403. A T-shaped fitting 404 connects first open end 402 to tubing 40. An L-shaped fitting 405 connects second end 403 to tubing 42.

In use, the desired amount of liquid chemical to be applied is pumped into tubing 42 at a pressure below that which will activate check valves 60. Liquid will fill tubing 42 and channels 204 and 305 of parts 200 and 300. Note that check valve 204C prevents liquid from rising through channel 204 into connector 50. Note that in this embodiment, the size and amount of tubing 42 is selected so as that introducing the desired amount of liquid to be sprayed into the system completely fills all of tubing 42. Assuming that sufficient liquid is introduced to completely fill the system, liquid reaching the end of tubing 40 and 42 will fill reservoirs 400 until the float valve seals open end 402, thereby preventing the liquid from entering tubing 40 near the end of the line. After the desired amount of liquid is introduced, pressurized air is force through tubing 40 at a pressure sufficient to open check valves 204C and 60, thereby forcing the liquid from tubing 42, through channels 305 and out spray devices 70. Because the volume of tubing 42 has been selected to essentially correspond to the desired amount of liquid to be sprayed, the system contains little or no unsprayed liquid after application. As with the embodiments of FIGS. 1-4, the liquid chemical to be applied can be introduced to spray system 30 by means of a portable pumping unit connected to a pipe manifold.

Figure 11:
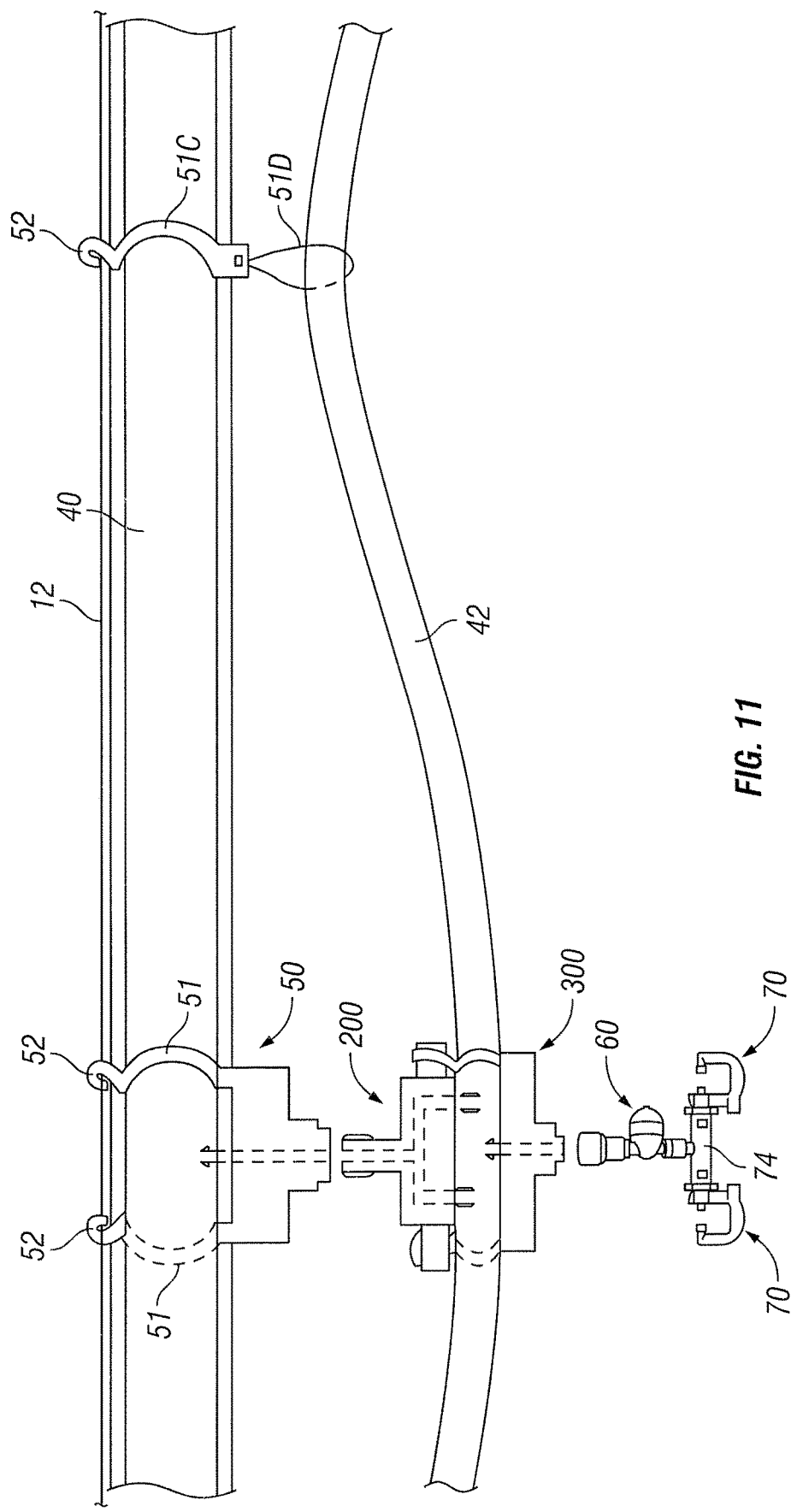
FIG. 11 is a plan view of certain components of a spray system according to another embodiment of the present invention.

FIG. 11 shows an alternative embodiment that utilizes a T-shaped connector 74 to connect two spray devices 70 in the manner described in connection with the embodiment of FIG. 5.

Figure 12:
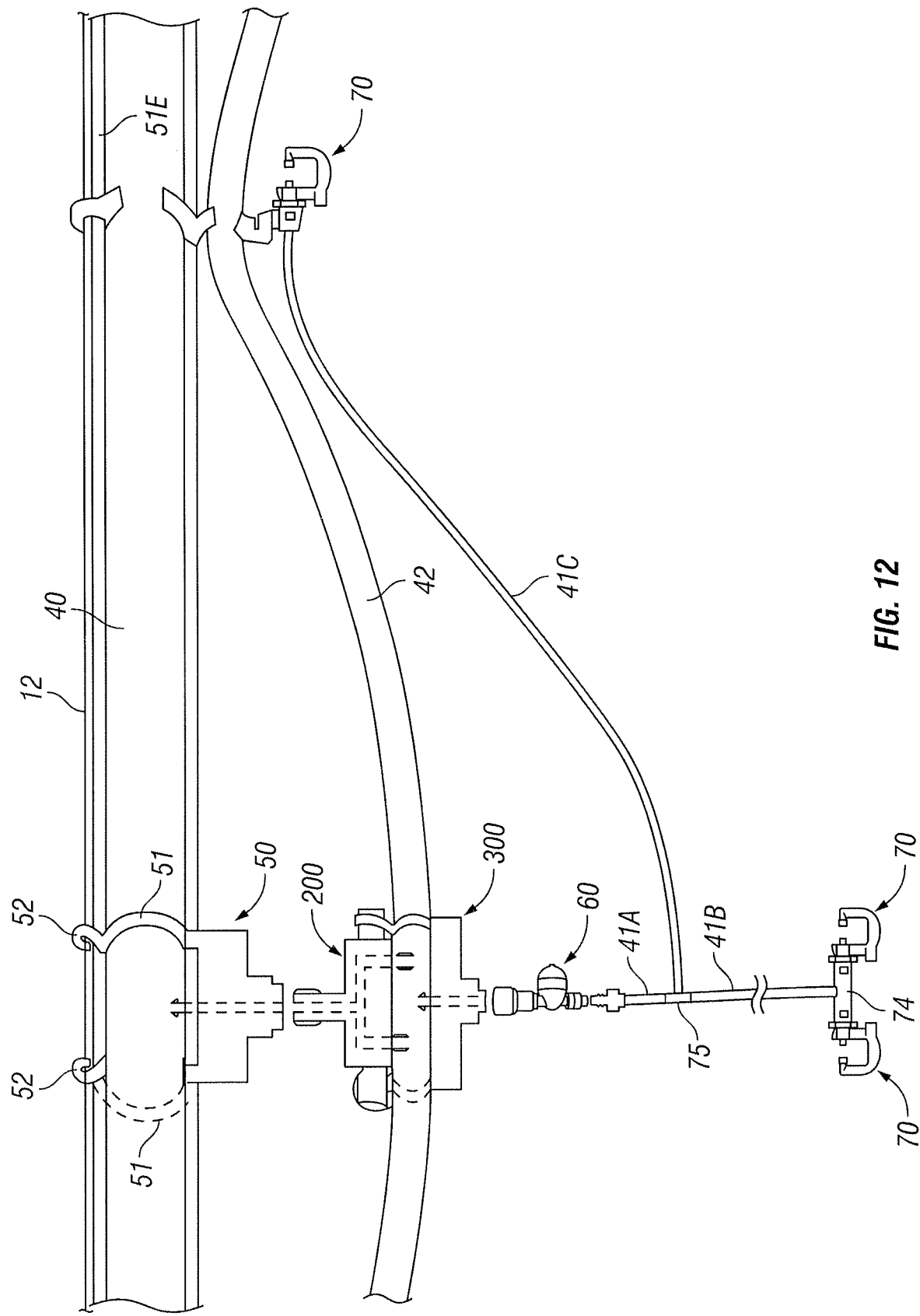
FIG. 12 is a plan view of certain components of a spray system according to another embodiment of the present invention.

FIG. 12 shows an alternative embodiment of spray system 30 with features similar to those in the embodiment of FIG. 7. Specifically, tubing sections 41A, 41B and 41C and T-shaped connector 75 are connected to third part 300 instead of to connector 50. In this embodiment, C-hook 51A has been replaced with a dual C-hook 51E that engages both tubing 40 and tubing 42.

Figure 13:
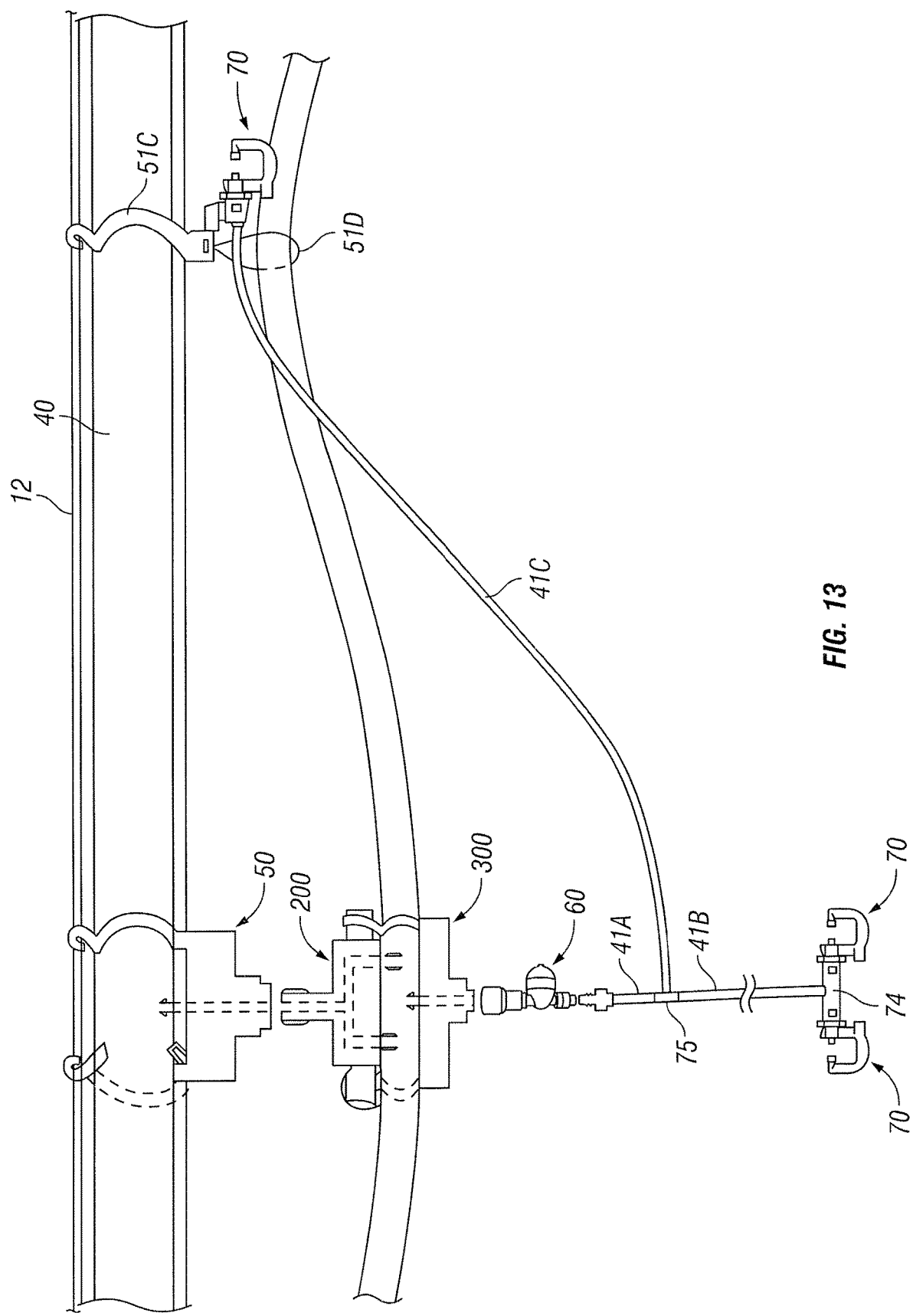
FIG. 13 is a plan view of certain components of a spray system according to another embodiment of the present invention.

FIG. 13 shows yet another embodiment of the present invention that includes a spray device 70 connected to C-hook 51C. Note that the C-hooks 51A, 51C and 51E can be configured so as to permit spray devices 70 to be oriented in a variety of positions so as to provide the desired spray pattern.

Figure 14:
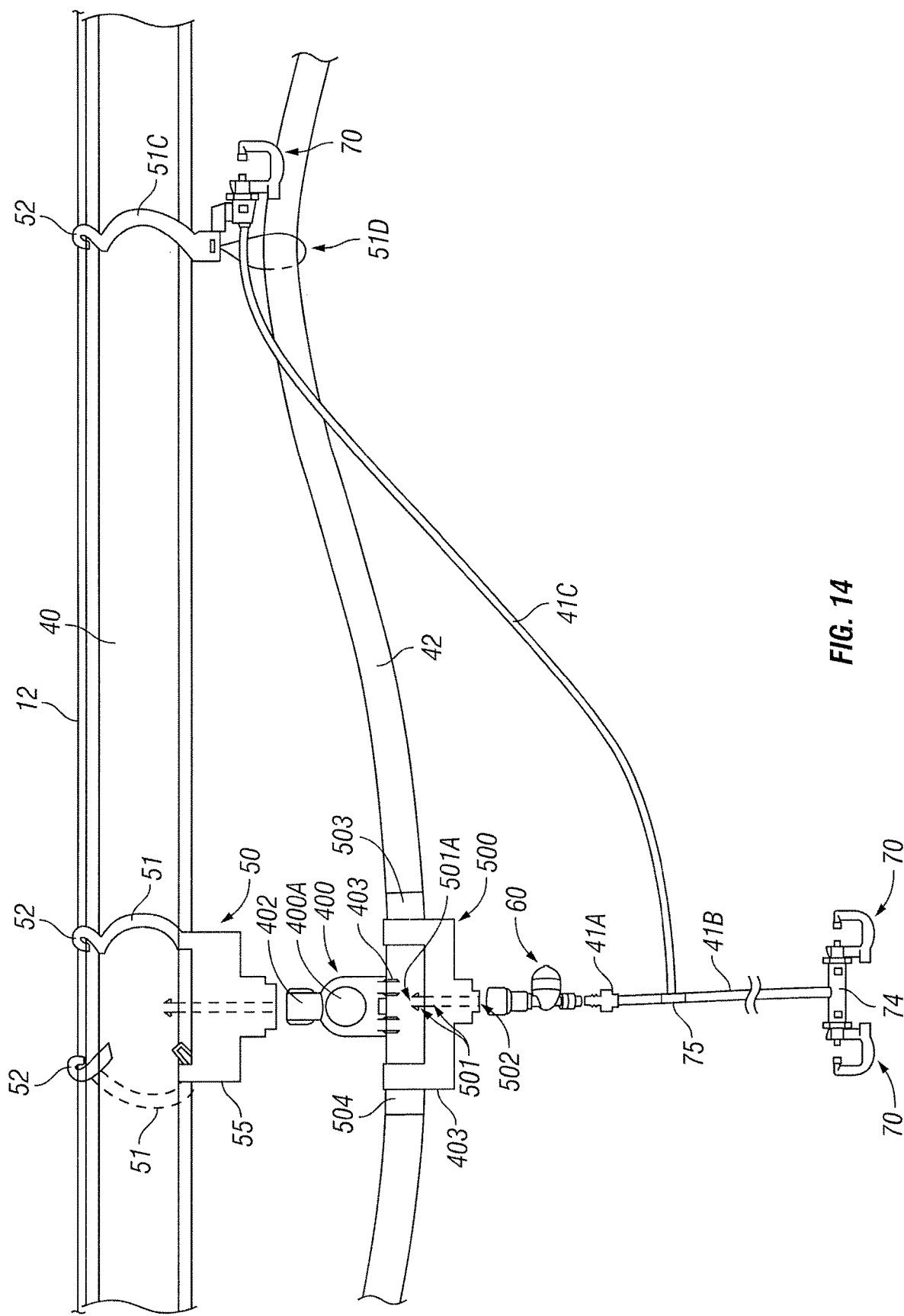
FIG. 14 is a plan view of certain components of a spray system according to another embodiment of the present invention.

FIG. 14 shows a spray system 30 according to another embodiment of the present invention. In this embodiment, first open end 402 of a reservoir 400 is connected to connector portion 55 of connector 50. Reservoir 400 includes a pair of projections 403 inserted in openings in tubing 42. A fitting 500 includes a projection 501 that extends into tubing 42, a first inlet 501A, a first outlet 502, a second inlet 503 and a second outlet 504. First outlet 502, in the embodiment shown, is connected to check valve 60, from which tubing sections 41A, 41B and 41C and T-shaped connector 75 extend as described above. Note that as an alternative, spray device 70 can be directly connected to check valve 60 as shown in the embodiment of FIG. 2 discussed above. Spray devices 70 can also be connected to fitting 500 in the manners described in connection with FIG. 2. Tubing 42 is connected to second inlet 503 and second outlet 504.

In use, the introduction of liquid into tubing 42 fills tubing 42 and reservoirs 400 until float valve 400A rises and seals against the top of reservoir 400. Pressurized air is then forced through tubing 40 as described above to expel the liquid through spray devices 70. Note that the interior of reservoir 400 may be provided at the top with an o-ring or other device against which float valve 400A seals. Reservoir 400 may also be configured such that float valve 400A cannot seal against the bottom of reservoir 400, thereby ensuring that all of the liquid can be expelled from the system.

Figure 15:
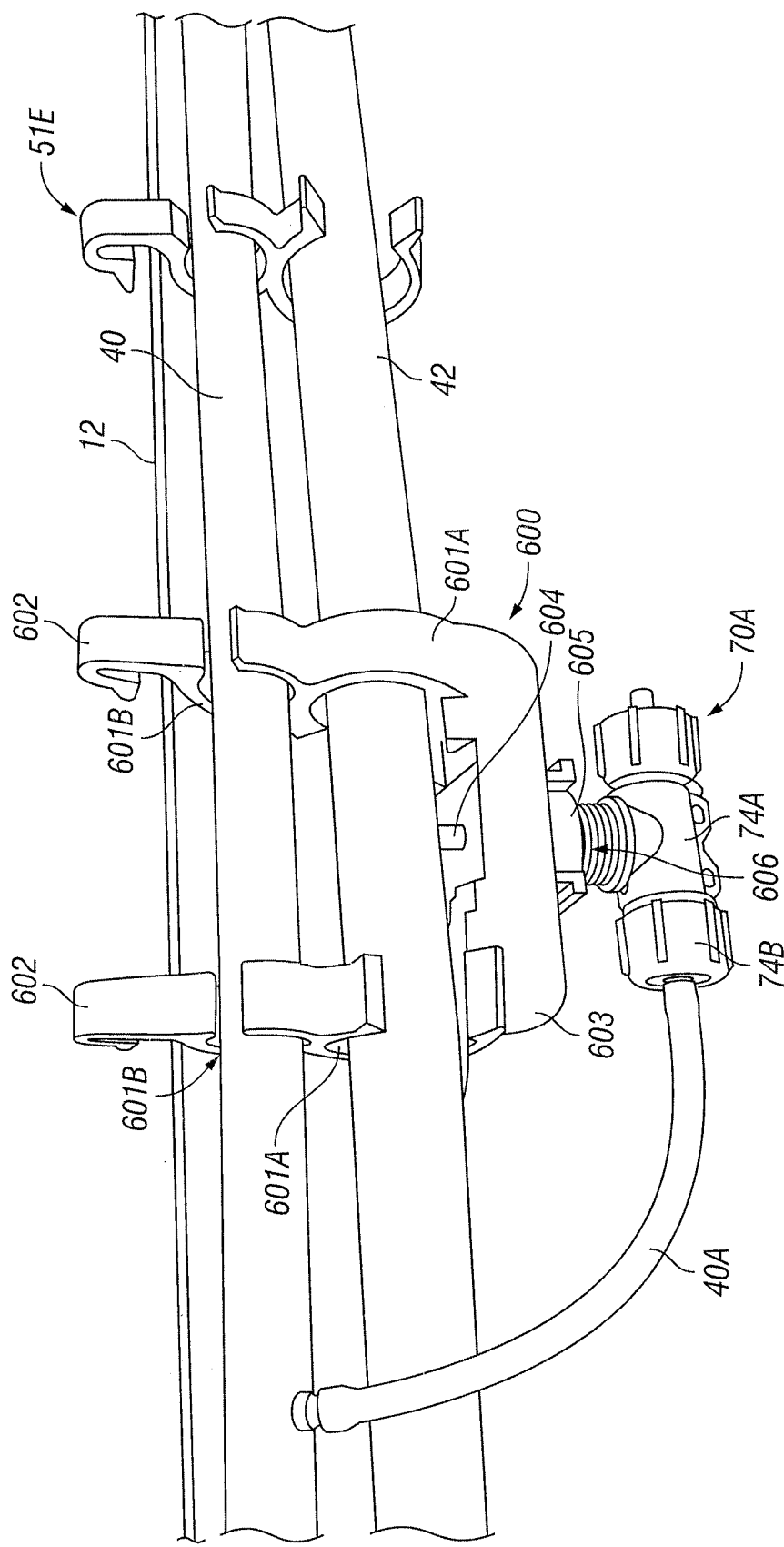
FIG. 15 is a perspective view of certain components of a spray system according to another embodiment of the present invention.

FIG. 15 illustrates another embodiment of the present invention. In this embodiment, a connector 600 generally includes a first pair of oppositely facing C-hooks 601A and a second pair of C-hooks 601B, a trellis wire hook 602, a base 603 (which may be curved) having a projection 604 extending therefrom and a connector section 605 adjacent an outlet 606. Connector 600 includes an internal passageway similar to that described above in connection with connector 50. Connector 600 as shown is designed to receive first tubing 40 in C-hooks 601B and second tubing 42 in C-hooks 601A.

In this embodiment, a spray device 70A is mounted to connector 50 by use of a connector 74A. Tubing 40A is in fluid communication at one end with tubing 40 and at its opposite end with fitting 74B so as to connect tubing 40A to connector 74A. In this embodiment, spray device 70A is a fogger style spray device such as the Turbofogger spray device presently offered for sale by Jain Irrigation, Inc. of Fresno, California. Spray device 70A can include an integral leak prevention device. Spray device 70A is designed to produce a mist of relatively small liquid droplets when pressurized to or above a threshold level. In use, tubing 40 is filled with the liquid to be sprayed. The liquid travels through tubing 40A to connector 74A and spray device 70A. At the desired application time, pressurized air is introduced into tubing 42 to pressurize the liquid and expel it through spray device 70A in the form of a mist of liquid droplets.

Figure 16:
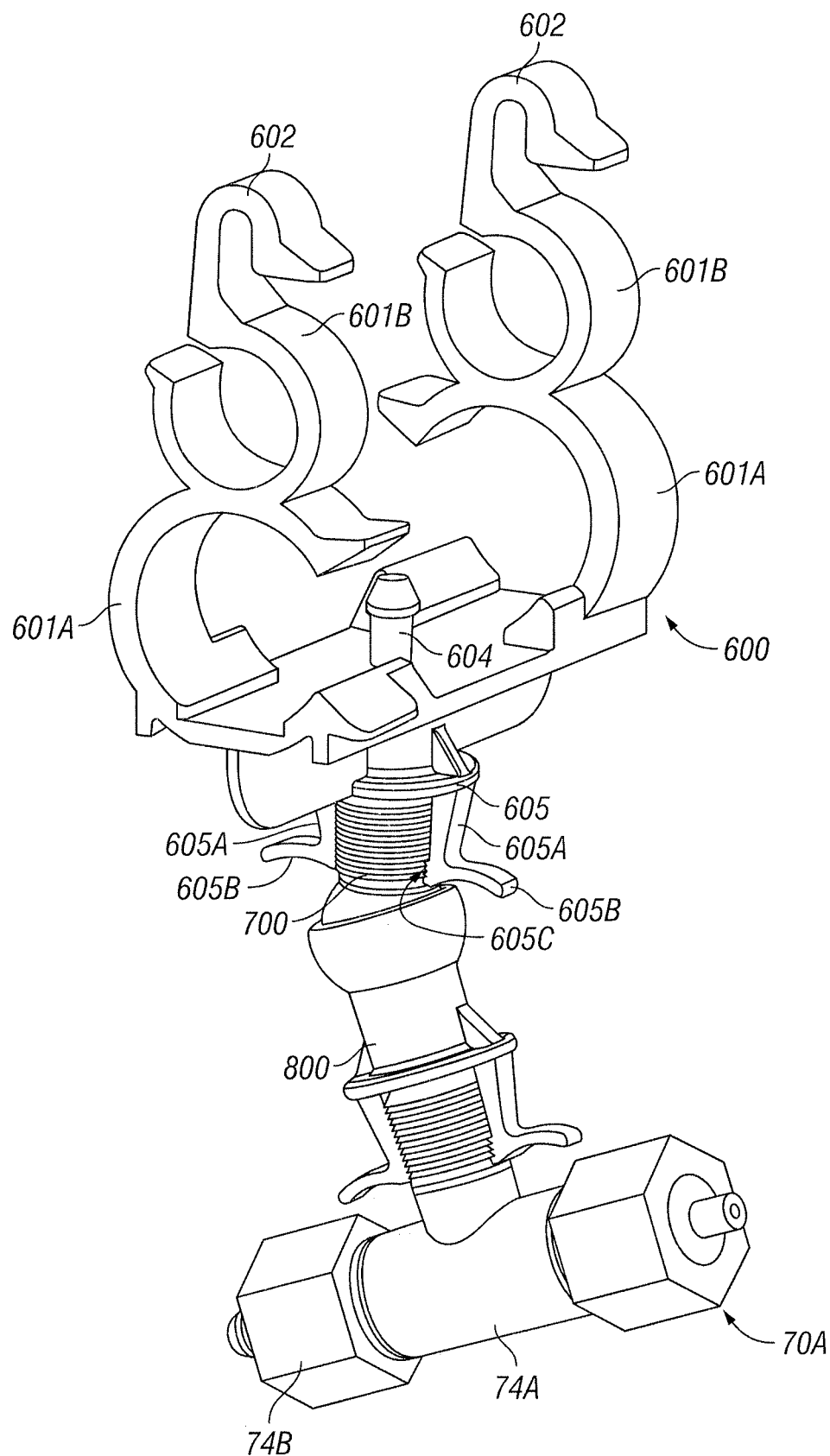
FIG. 16 is a perspective view of certain components of a spray system according to another embodiment of the present invention.
Figure 17:
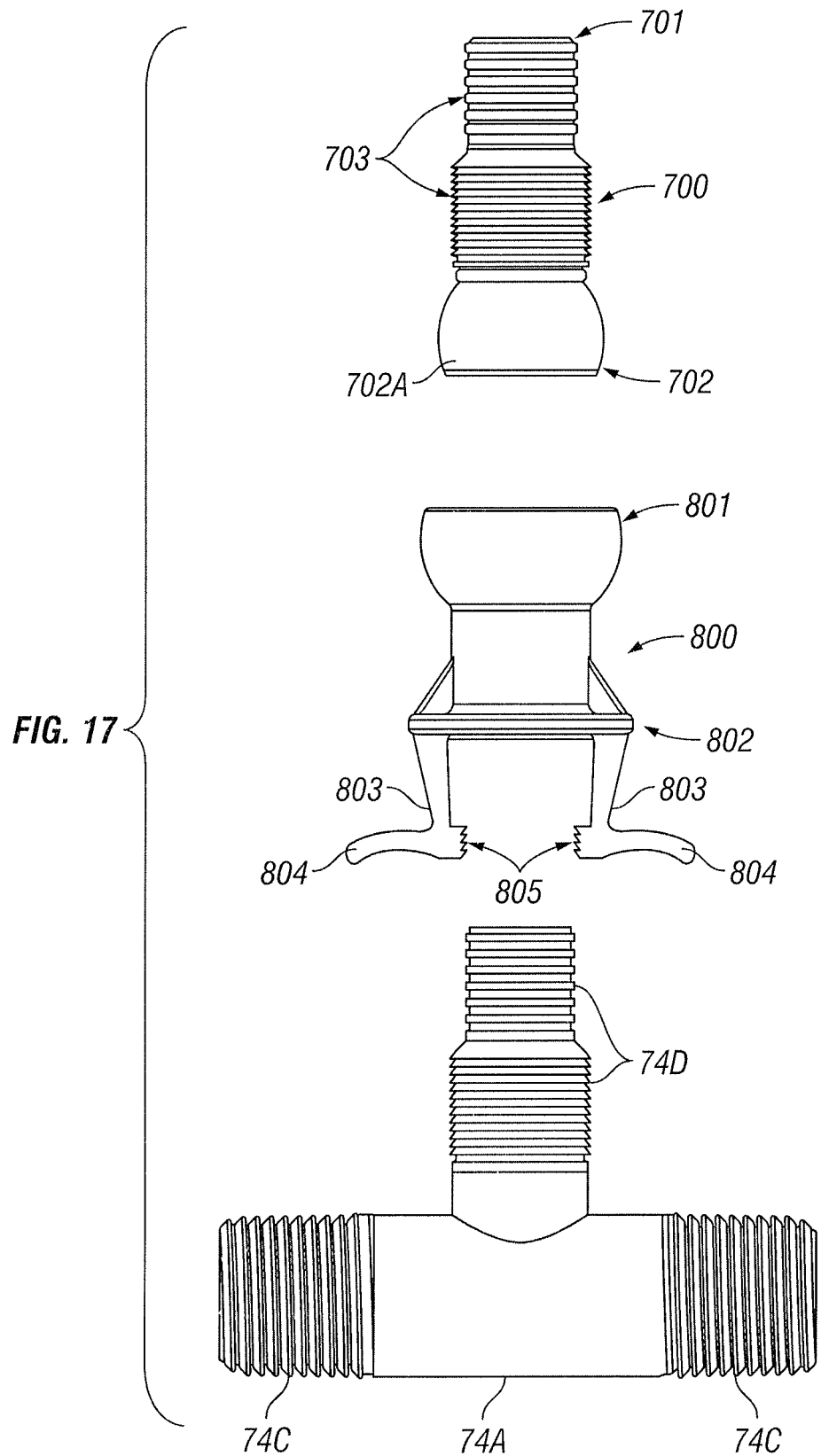
FIG. 17 is an exploded plan view of certain components of the embodiment shown in FIG. 16.

FIGS. 16 and 17 show another embodiment of the present invention. In this embodiment, connector 600 further includes a pair of flexible legs 605A extending from connection portion 605. Tabs 605B extend from legs 605A. Legs 605A may be provided with ridges or teeth 605C on the interior surface thereof.

The embodiment shown further includes a ball and socket joint having a first member 700 and a second member 800. First member 700 has a first end 701 and a second 702. First member 700 may be of varying diameter along a portion of its length and may be provided with ridges or teeth 703 as shown in FIG. 17. Second end 702 includes a partially spherical or similarly rounded surface 702A. A passageway extends through first member 700 from first end 701 to second end 702.

Second member 800 includes a first end 801 and a second 802 with a plurality of legs 803 extending therefrom. Tabs 804 extend from legs 803. The interior of legs 803 may be provided with ridges or teeth 805. The interior of first end 801 of second member 800 is in the form of a socket for receiving second end 702 of first member 700. A passageway extends through second member 800 from first end 801 to second end 802.

Connector 74A includes threads 74C for receiving spray device 70A and fitting 74B and connecting them to connector 74A. Connector 74A further includes ridges or teeth 74D.

To assemble the embodiment of FIGS. 16 and 17, second end 702 of first member 700 is inserted in first end 801 of second member 800 so as to form a ball and socket joint. First end 701 of first member 700 is inserted between legs 605A of connector 600, thereby forcing legs 605A outwardly as first member 700 is inserted. Ridges or teeth 605C will engage ridges or teeth 703 on member 700 to hold member 700 in place. To release member 700 from connector 600, tabs 605B are used to flex legs 605A outwardly, thereby disengaging teeth 605C from teeth 703. Connector 74A can be connected to and disengaged from second member 800 in a similar manner. As shown in FIG. 16, this embodiment of the invention permits spray device 70A to be positioned as desired by moving second member 800 relative to first member 700 via the engagement between second end 702 of first member 700 and first end 801 of second member 800.

Figure 18:
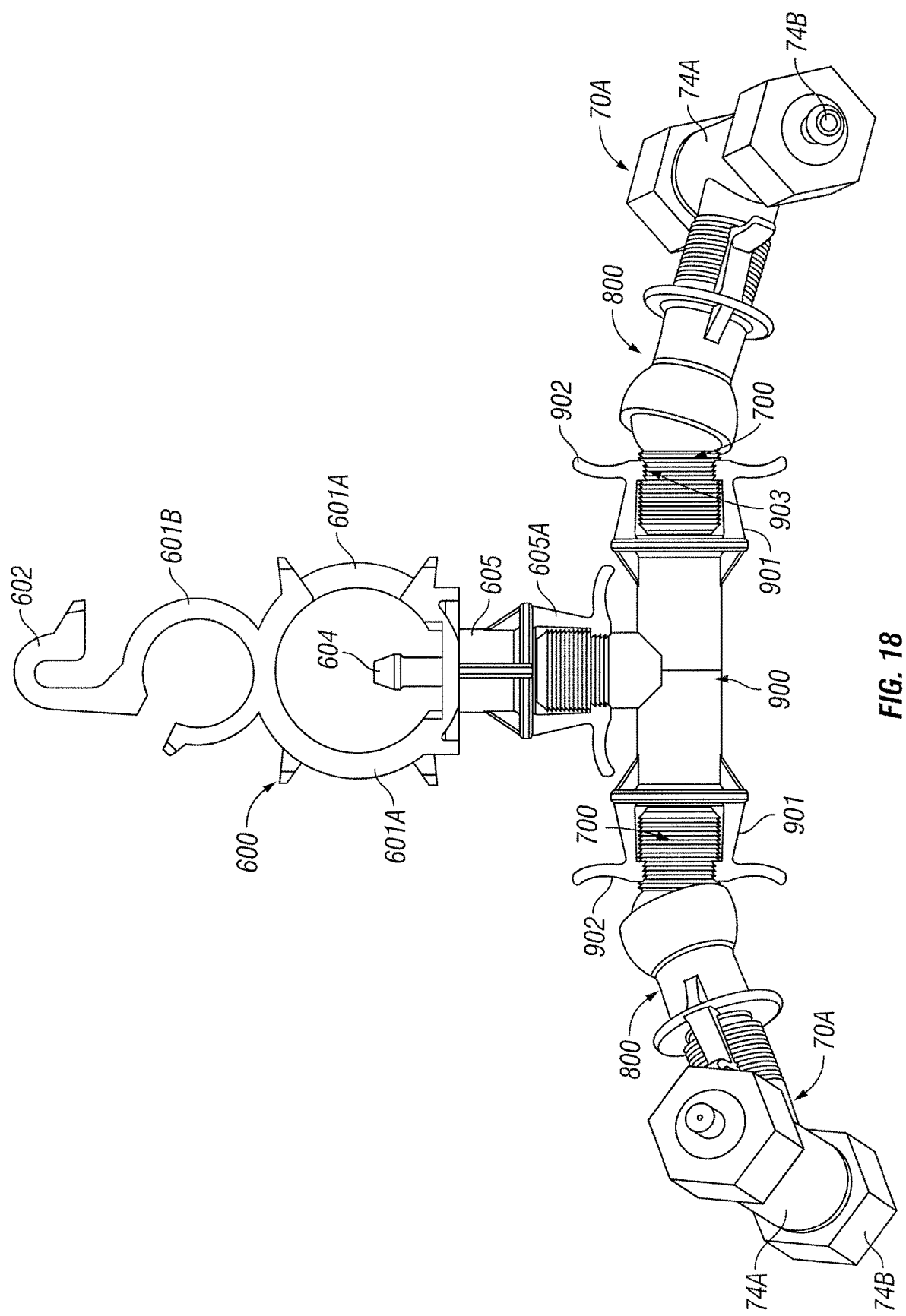
FIG. 18 is a perspective view of certain components of a spray system according to another embodiment of the present invention.

FIG. 18 shows yet another embodiment of the present invention. In this embodiment, a connector 900 having legs 901 with tabs 902 and ridges or teeth 903 connects directly to connection portion 605 of connector 600 as shown. First members 700 of the ball and socket joint engage between legs 901 as shown in FIG. 18.

Figure 19:
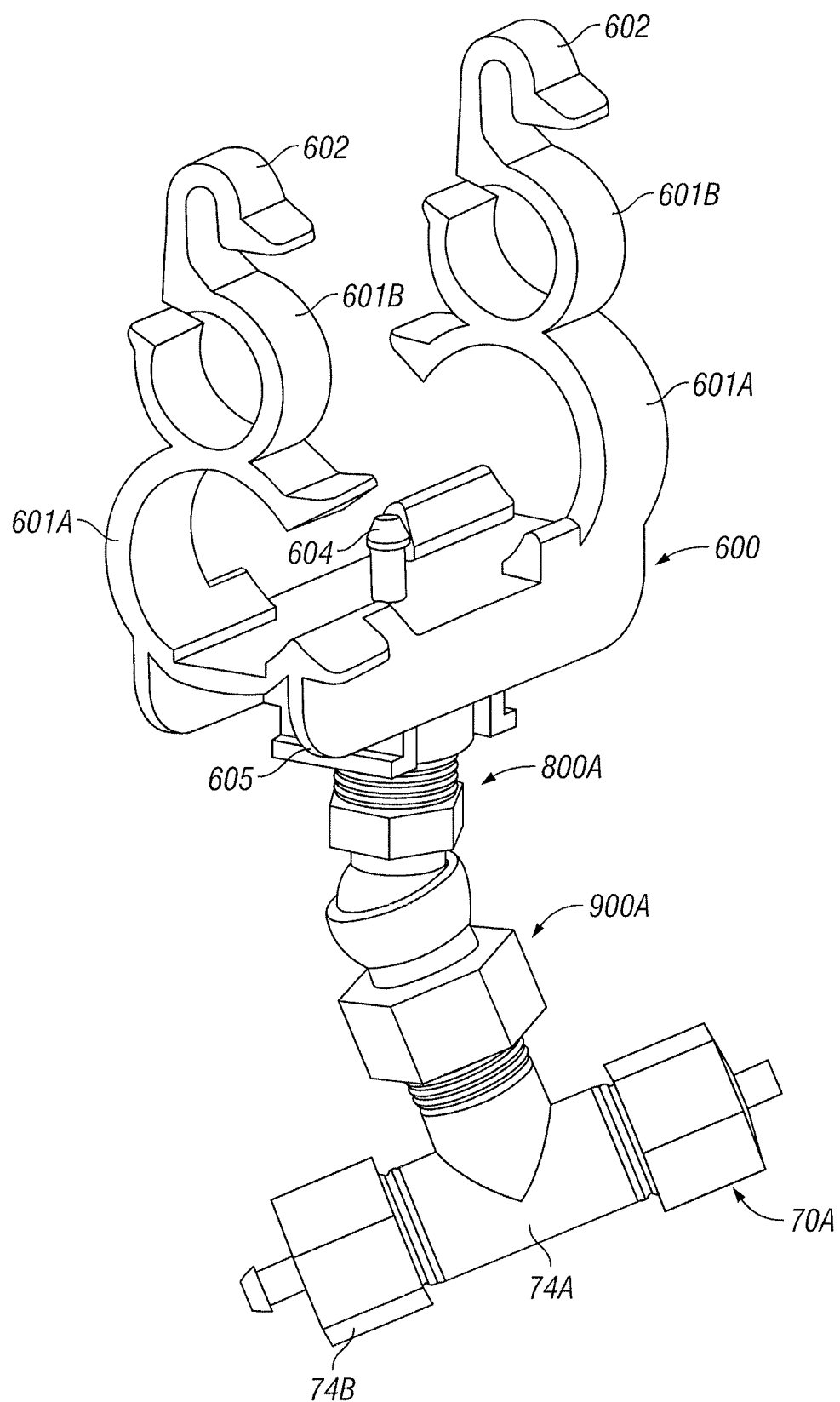
FIG. 19 is a perspective view of certain components of a spray system according to another embodiment of the present invention.

FIG. 19 shows another embodiment of the present invention. In this embodiment, a ball and socket joint includes a first member 800A and a second member 900A connected to connector 600 and connector 74A via screw threads, as opposed to the flexible leg and teeth arrangement described above.

Figure 20:
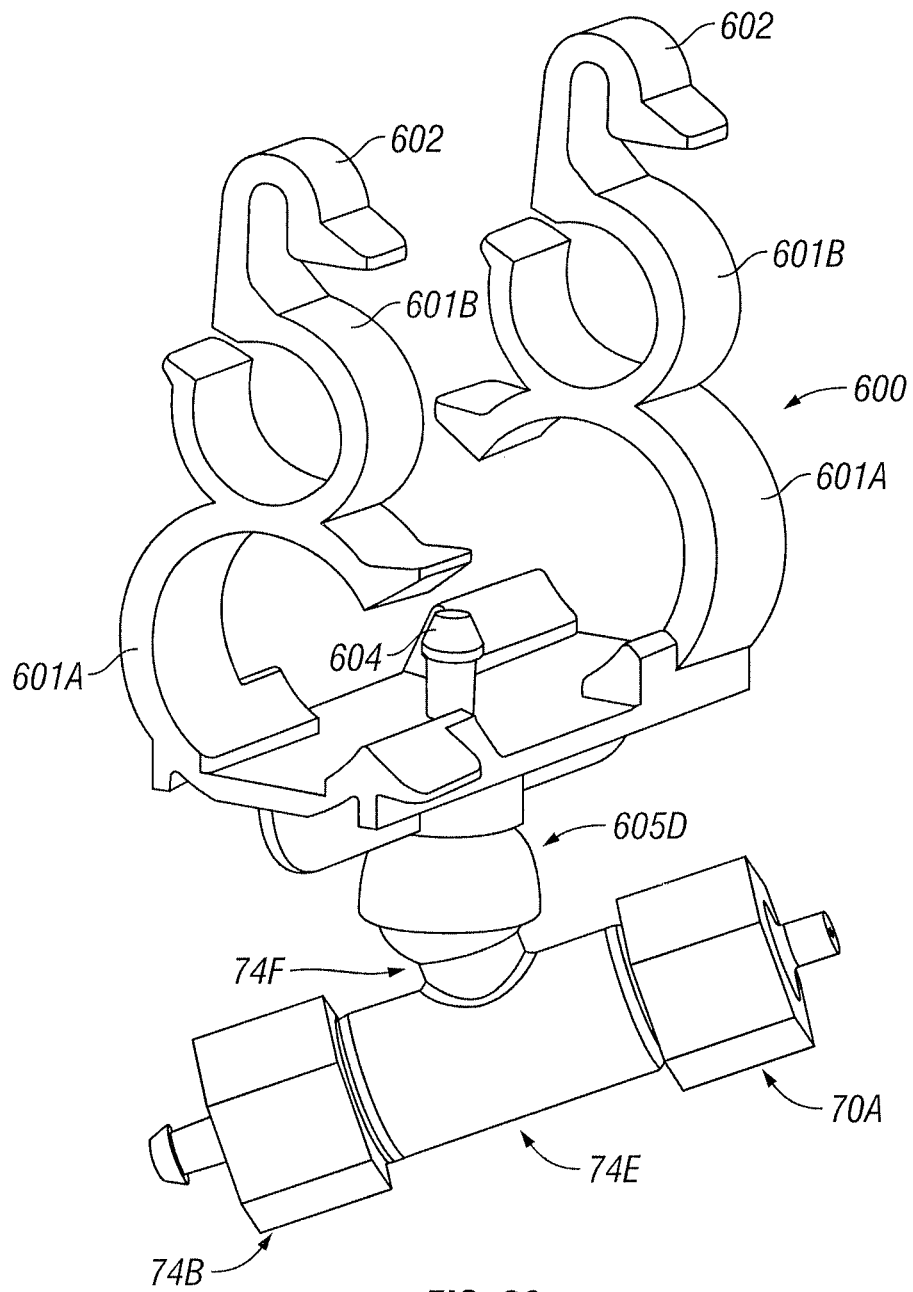
FIG. 20 is a perspective view of certain components of a spray system according to another embodiment of the present invention.

FIG. 20 shows yet another embodiment of the present invention. In this embodiment, one half of a ball and socket joint is formed on connector 600 as component 605D and the second half of the ball and socket joint is formed on connector 74E as component 74F.

Although embodiments of the present invention have been shown and described in detail the same is to be taken by way of explanation and not as a limitation on the invention. Numerous modifications can be made within the scope of the invention. Although the invention has been described in connection with applying ozonated water and/or agricultural chemicals, it also includes other uses. For example, the invention includes application of water cooling sprays for purposes such as preventing sunscald on apples. The invention likewise includes use for spreading pheromones (sterile insects) in fruit orchards. When other normal insects mate with pheromones, their eggs are sterile, thus reducing the buildup of harmful insect populations. Fruit pollen can be mixed with water and sprayed on flowering buds to pollenate the flowers, thereby reducing the need for pollination by bees or other insects. Additionally, the ozonated water droplets can be electrostatically charged to assist in directing the droplets onto the plant tissues being sprayed. Other uses and modifications of the disclosed embodiments also fall within the scope of the invention.

What is claimed is:

1. A method of applying a liquid over an area of the surface of the Earth, including:
   selecting the liquid to be applied;
   providing a source of the liquid;
   selecting an area of the surface of the Earth over which to apply the liquid;
   providing a system having:
   a first tube for transporting the liquid from the source of the liquid through the system, the first tube having a passageway therethrough and a wall surrounding the passageway, the wall having an outer surface and an inner surface, the first tube further including an opening perpendicular to the passageway of the first tube, the opening extending through the outer surface of the wall of the first tube at a first location on the outer surface of the wall of the first tube and extending through the inner surface of the wall of the first tube, the first tube further including a second location on the outer surface of the wall of the first tube directly opposite the first location on the outer surface of the wall of the first tube, wherein the passageway of the first tube is located between the first location on the outer surface of the wall of the first tube and the second location on the outer surface of the wall of the first tube,
   a connector secured to the first tube, the connector having a surface disposed against the outer surface of the wall of the first tube and surrounding the first location on the outer surface of the wall of the first tube, a projection extending from the surface of the connector through the opening in the wall of the first tube and into the passageway of the first tube, the projection having an inlet in fluid communication with the passageway of the first tube, an outlet, and a passageway in fluid communication with the inlet of the projection and the outlet of the connector, and
   a spray device in fluid communication with the outlet of the connector;
   disposing the first tube generally parallel to the selected area of the surface of the Earth such that the vertical distance from the first location on the outer surface of the wall of the first tube to the selected area of the surface of the Earth is not greater than the vertical distance from any other location on the outer surface of the wall of the first tube to the selected area of the surface of the Earth and the opening in the first tube is located between the second location on the outer surface of the wall of the first tube and the selected area of the surface of the Earth;
   disposing the spray device below the first tube;
   introducing the first amount of the liquid to be applied to the selected area of the surface of the Earth from the source of the liquid into the passageway of the first tube;
   subsequently pressurizing a second amount of the liquid from the source of the liquid; and pressurizing the first amount of the liquid in the passageway of the first tube by introducing the pressurized second amount of the liquid from the source of the liquid into the passageway of the first tube, thereby transporting the first amount of the liquid in the passageway of the first tube from the passageway of the first tube, through the connector, and through the spray device in response to the pressurization of the first amount of the liquid in the passageway of the first tube by the introduction of the pressurized second amount of the liquid from the source of the liquid into the passageway of the first tube, thereby applying the first amount of the liquid to the selected area of the surface of the Earth.

2. The method according to claim 1, further including providing a ball and socket joint as part of the system, the ball and socket joint having a passageway therethrough, and wherein the spray device is in fluid communication with the outlet of the connector through the passageway of the ball and socket joint, and the first amount of the liquid is transported from the passageway of the first tube, through the connector, through the ball and socket joint, and through the spray device in response to pressurization of the first amount of the liquid in the passageway of the first tube.

3. The method according to claim 2, further including providing a second connector as part of the system and a second spray device as part of the system, the second connector having an inlet in fluid communication with the passageway of the ball and socket joint, a first outlet in fluid communication with one of the spray devices, and a second outlet in fluid communication with the other spray device.

4. The method according to claim 1, wherein the connector at least partially surrounds the first tube.

5. The method according to claim 4, further including providing at least one wire as part of the system and wherein the connector suspends the first tube from the wire above the selected area of the surface of the Earth over which the first amount of the liquid is to be applied.

6. The method according to claim 1, wherein the source of liquid includes an enclosure for transporting the liquid and the first tube is external to the enclosure.

7. The method according to claim 1, wherein the liquid is ozonated water.

8. The method according to claim 1, wherein the opening in the wall of the first tube is located directly above the connector.

9. The method according to claim 1, wherein the inlet of the projection is located above the opening in the wall of the first tube.

10. The method according to claim 1, further including the step of disposing the inlet of the projection, the passageway through the projection, the outlet of the connector, and the opening in the wall of the first tube along a straight line.

11. A method of applying a liquid over an area of the surface of the Earth, including:
selecting the liquid to be applied;
providing a source of the liquid;
selecting an area of the surface of the Earth over which to apply the liquid;
providing a system having:
a first tube for transporting the liquid from the source of the liquid through the system, the first tube having a passageway therethrough and a wall surrounding the passageway, the wall having an outer surface and an inner surface, the first tube further including an opening perpendicular to the passageway of the first tube, the opening extending through the outer surface of the wall of the first tube at a first location on the outer surface of the wall of the first tube and extending through the inner surface of the wall of the first tube, the first tube further including a second location on the outer surface of the wall of the first tube directly opposite the first location on the outer surface of the wall of the first tube, wherein the passageway of the first tube is located between the first location on the outer surface of the wall of the first tube and the second location on the outer surface of the wall of the first tube;
a connector secured to the first tube, the connector having a projection extending through the opening in the wall of the first tube and into the passageway of the first tube, the projection having an inlet in fluid communication with the passageway of the first tube and located above the opening in the wall of the first tube, an outlet, and a passageway in fluid communication with the inlet of the projection and the outlet of the connector; and
a spray device in fluid communication with the outlet of the connector;
disposing the first tube generally parallel to the selected area of the surface of the Earth such that the opening extending through the wall of the first tube is located between the second location on the outer surface of the wall of the first tube and the selected area of the surface of the Earth;
disposing the spray device below the first tube;
introducing the first amount of the liquid to be applied to the selected area of the surface of the Earth from the source of the liquid into the passageway of the first tube;
subsequently pressurizing a second amount of the liquid from the source of the liquid; and
pressurizing the first amount of the liquid in the passageway of the first tube by introducing the pressurized second amount of the liquid from the source of the liquid into the passageway of the first tube, thereby transporting the first amount of the liquid in the passageway of the first tube from the passageway of the first tube, through the connector, and through the spray device in response to the pressurization of the first amount of the liquid in the passageway of the first tube by the introduction of the pressurized second amount of the liquid from the source of the liquid into the passageway of the first tube, thereby applying the first amount of the liquid to the selected area of the surface of the Earth.

* * * * *